United States Patent [19]
de Bruijn et al.

[11] Patent Number: 5,561,770
[45] Date of Patent: Oct. 1, 1996

[54] SYSTEM AND METHOD FOR DETERMINING WHETHER TO TRANSMIT COMMAND TO CONTROL COMPUTER BY CHECKING STATUS OF ENABLE INDICATOR ASSOCIATED WITH VARIABLE IDENTIFIED IN THE COMMAND

[75] Inventors: Ronny P. de Bruijn, St. Jansteen; Leonardus A. van Weele, Terneuzen, both of Netherlands; Marc L. K. Verboven, Nazareth, Belgium; Roger R. Vermeire, Terneuzen, Netherlands; Oscar E. Schulze, Midland, Mich.; Brian G. Bell, Midland, Mich.; Dale H. Schultz, Midland, Mich.

[73] Assignee: The Dow Chemical Company, Midland, Mich.

[21] Appl. No.: 391,521

[22] Filed: Feb. 21, 1995

Related U.S. Application Data

[62] Division of Ser. No. 279,697, Jul. 25, 1994, Pat. No. 5,428,745, which is a continuation of Ser. No. 191,766, Feb. 4, 1994, abandoned, which is a continuation of Ser. No. 898,923, Jun. 12, 1992, abandoned.

[51] Int. Cl.⁶ .................................................. G06F 13/00
[52] U.S. Cl. ............................... 395/200.06; 395/200.09; 395/182.11; 395/187.01; 380/25; 364/146; 364/147; 364/148; 364/DIG. 1
[58] Field of Search .................................. 395/200, 800, 395/186, 187.01, 188.01, 200.01, 200.02, 200.06, 200.09, 200.11, 200.12, 200.13, 200.14, 200.2, 650, 700; 370/60, 94.1; 380/25, 49; 364/148, 146, 147

[56] References Cited

U.S. PATENT DOCUMENTS

| | | | |
|---|---|---|---|
| 4,074,119 | 2/1978 | Steinert et al. | 364/807 |
| 4,212,057 | 7/1980 | Devlin et al. | 395/478 |
| 4,215,398 | 7/1980 | Burtkett et al. | 364/136 |
| 4,227,253 | 10/1980 | Ehrsam et al. | 380/45 |
| 4,264,782 | 4/1981 | Konheim | 364/222.2 |
| 4,304,001 | 12/1981 | Cope | 395/182.02 |
| 4,310,720 | 1/1982 | Check, Jr. | 380/25 |
| 4,325,120 | 4/1982 | Colley et al. | 395/375 |
| 4,402,046 | 8/1983 | Cox et al. | 395/200.08 |
| 4,410,983 | 10/1983 | Cope | 395/280 |
| 4,465,153 | 8/1984 | van de Pas et al. | 380/47 |
| 4,479,179 | 10/1984 | Dinwiddie, Jr. | 395/845 |
| 4,493,028 | 1/1985 | Heath | 395/821 |
| 4,539,652 | 9/1985 | Rubin | 395/280 |
| 4,578,530 | 3/1986 | Zeidler | 380/24 |
| 4,593,353 | 6/1986 | Pickholtz | 380/4 |
| 4,596,898 | 6/1986 | Pemmaraju | 380/45 |
| 4,607,256 | 4/1986 | Henzel | 370/85.4 |

(List continued on next page.)

FOREIGN PATENT DOCUMENTS

| | | |
|---|---|---|
| 454263 | 10/1991 | European Pat. Off. . |
| 4132100 | 4/1992 | Germany . |

*Primary Examiner*—Thomas C. Lee
*Assistant Examiner*—Moustafa Mohamed Meky
*Attorney, Agent, or Firm*—William J. Coughlin; Dale H. Schultz

[57] ABSTRACT

A secure front-end communication system which couples a plurality of actively redundant process control computers to a computer network. The system includes a front end computer which is capable of establishing time limited communication contracts with one or more computer entity on the computer network. Each time limited communication contract is based upon an acceptable response to the transmission of an unpredicable signal from the front end computer, such as an encrypted transformation of a psuedo-random number generated by the front end computer. A security table is used to identify the network entities that are permitted to send write command messages to the process control computers to which the front end computer is connected. The front end computer also includes at least one permissive table which is used to determined whether a write command message from the network entity should be transmitted to the process control computer for which the message was intended.

8 Claims, 16 Drawing Sheets

U.S. PATENT DOCUMENTS

| | | | |
|---|---|---|---|
| 4,609,777 | 9/1986 | Cargile | 380/4 |
| 4,622,630 | 11/1986 | Vora et al. | 364/134 |
| 4,625,076 | 11/1986 | Okamoto et al. | 380/23 |
| 4,652,990 | 3/1987 | Pailen et al. | 380/4 |
| 4,660,141 | 4/1987 | Ceccon et al. | 395/829 |
| 4,663,704 | 5/1987 | Jones et al. | 364/188 |
| 4,670,890 | 6/1987 | Titchener | 375/359 |
| 4,672,572 | 6/1987 | Alsberg | 380/23 |
| 4,683,968 | 8/1987 | Appelbaum et al. | 380/4 |
| 4,713,753 | 12/1987 | Boebert et al. | 395/491 |
| 4,723,284 | 2/1988 | Munck et al. | 380/25 |
| 4,771,462 | 9/1988 | Hannan et al. | 380/44 |
| 4,779,224 | 4/1988 | Moseley et al. | 395/188.01 |
| 4,796,232 | 1/1989 | House | 365/189.03 |
| 4,800,590 | 1/1989 | Vaughan | 380/25 |
| 4,803,618 | 2/1989 | Ita et al. | 395/474 |
| 4,809,327 | 2/1989 | Shima | 380/44 |
| 4,825,354 | 4/1989 | Agrawal et al. | 395/600 |
| 4,839,890 | 6/1989 | Seremau et al. | 370/84 |
| 4,853,962 | 8/1989 | Brockman | 380/44 |
| 4,864,494 | 9/1989 | Kobus, Jr. | 395/186 |
| 4,868,851 | 9/1989 | Trinidad et al. | 375/267 |
| 4,872,106 | 10/1989 | Slater | 395/182.11 |
| 4,881,263 | 11/1989 | Herbison et al. | 380/21 |
| 4,882,752 | 11/1989 | Lindman et al. | 380/25 |
| 4,885,777 | 12/1989 | Takaragi et al. | 380/30 |
| 4,888,800 | 12/1989 | Marshall et al. | 380/21 |
| 4,897,777 | 1/1990 | Janke et al. | 364/134 |
| 4,903,190 | 2/1990 | Akai | 364/131 |
| 4,919,545 | 4/1990 | Yu | 380/3 |
| 4,924,513 | 5/1990 | Herbison et al. | 380/21 |
| 4,926,418 | 5/1990 | Cidon et al. | 370/85.5 |
| 4,926,481 | 5/1990 | Collins, Jr. | 380/25 |
| 4,930,073 | 5/1990 | Cina, Jr. | 395/375 |
| 4,932,054 | 6/1990 | Chou et al. | 380/4 |
| 4,937,736 | 6/1990 | Chang et al. | 395/418 |
| 4,944,008 | 7/1990 | Piosenka et al. | 380/46 |
| 4,956,769 | 9/1990 | Smith | 395/600 |
| 4,958,270 | 9/1990 | McLaughlin et al. | 395/182.11 |
| 4,964,163 | 10/1990 | Berry | 380/23 |
| 4,969,189 | 11/1990 | Ohta et al. | 380/25 |
| 4,975,865 | 12/1990 | Carrette et al. | 395/11 |
| 4,984,271 | 1/1991 | Goto | 380/25 |
| 4,995,040 | 2/1991 | Best et al. | 371/36 |
| 4,996,655 | 2/1991 | Chadwick et al. | 364/550 |
| 4,999,768 | 3/1991 | Hirokawa | 395/200.07 |
| 5,003,593 | 3/1991 | Mihm, Jr. | 380/21 |
| 5,006,976 | 4/1991 | Jundt | 364/184 |
| 5,007,088 | 4/1991 | Ooi et al. | 380/46 |
| 5,008,805 | 4/1991 | Fiebig et al. | 364/184 |
| 5,012,515 | 4/1991 | McVitie | 380/49 |
| 5,056,140 | 10/1991 | Kimbell | 380/23 |
| 5,065,429 | 11/1991 | Lang | 380/25 |
| 5,191,611 | 3/1993 | Lang | 380/25 |
| 5,204,966 | 4/1993 | Wittenberg et al. | 395/800 |
| 5,301,273 | 4/1994 | Konishi | 395/200.02 |
| 5,319,760 | 6/1994 | Mason et al. | 395/400 |
| 5,347,633 | 9/1994 | Ashfield et al. | 395/200.15 |
| 5,379,426 | 1/1995 | Foss et al. | 395/650 |
| 5,392,399 | 2/1995 | Gilbrech | 395/200.02 |

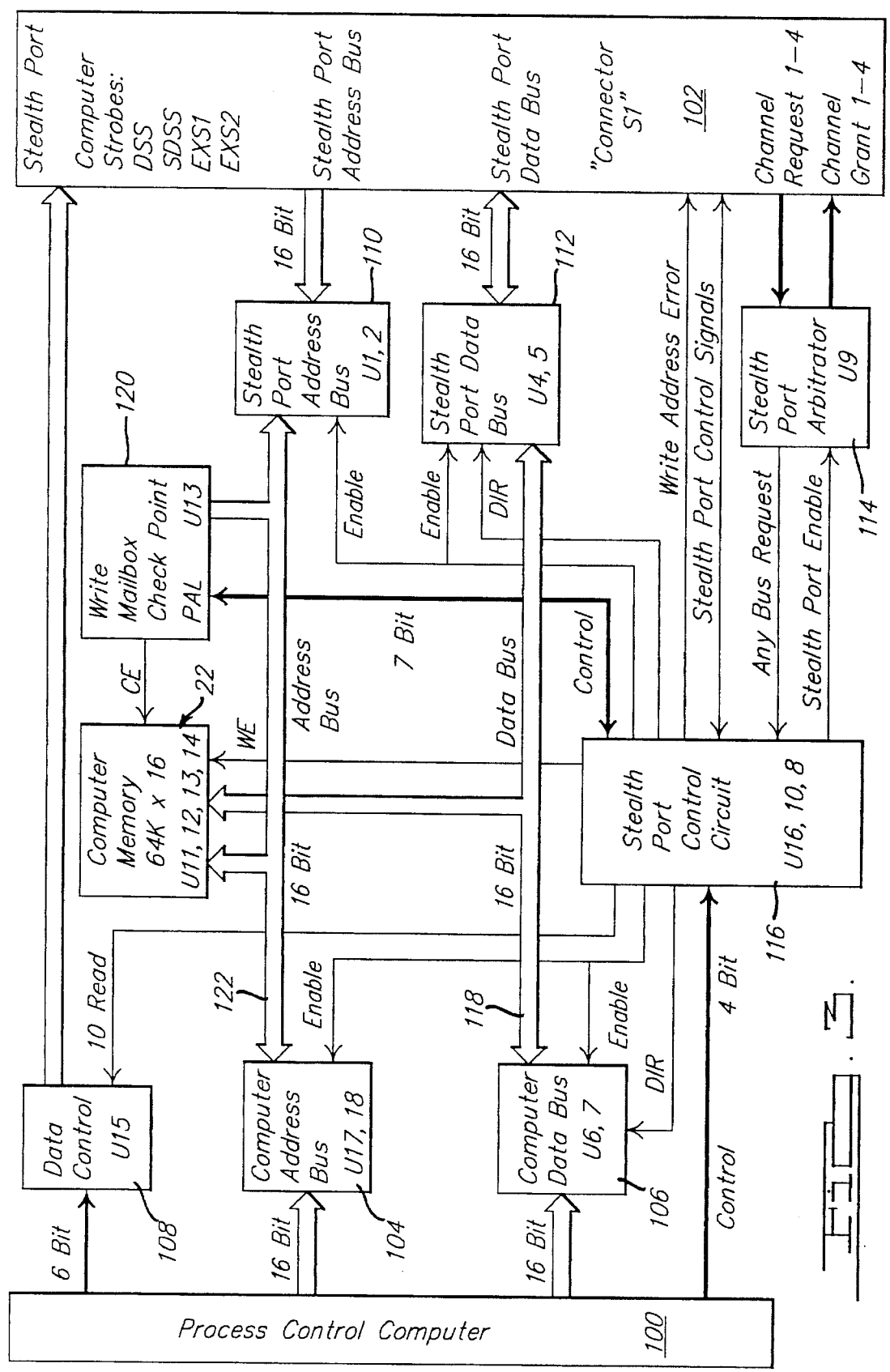

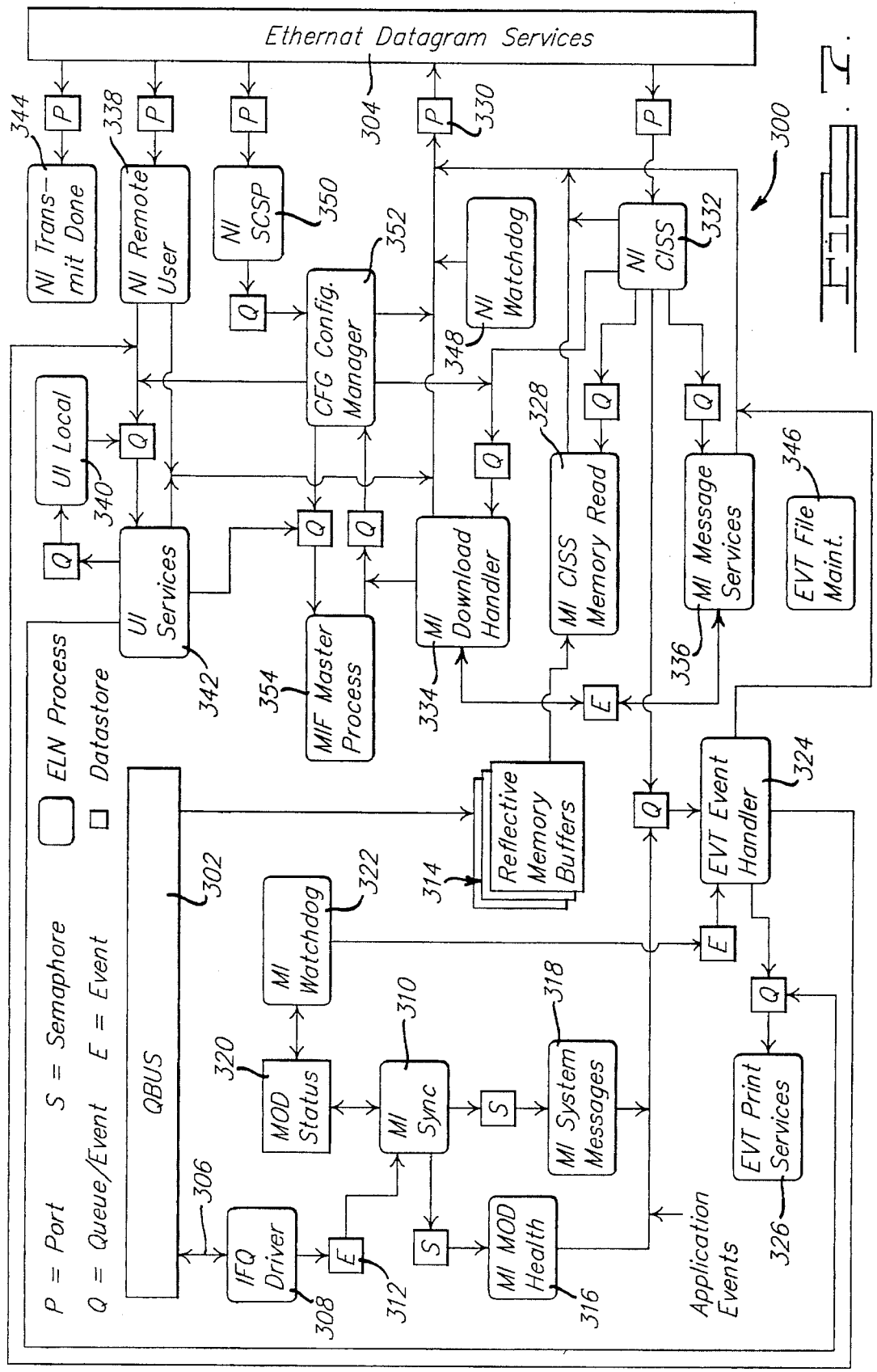

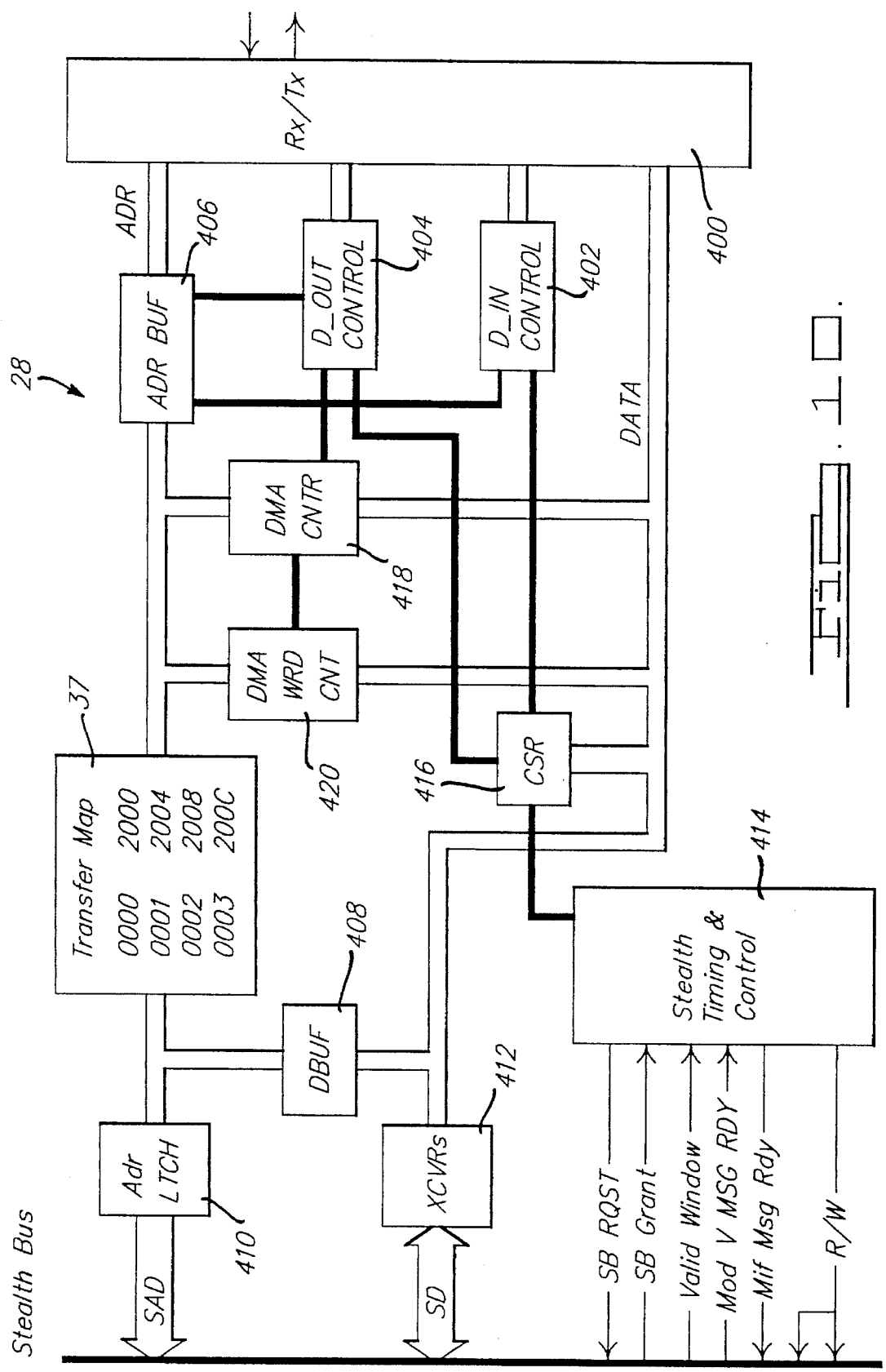

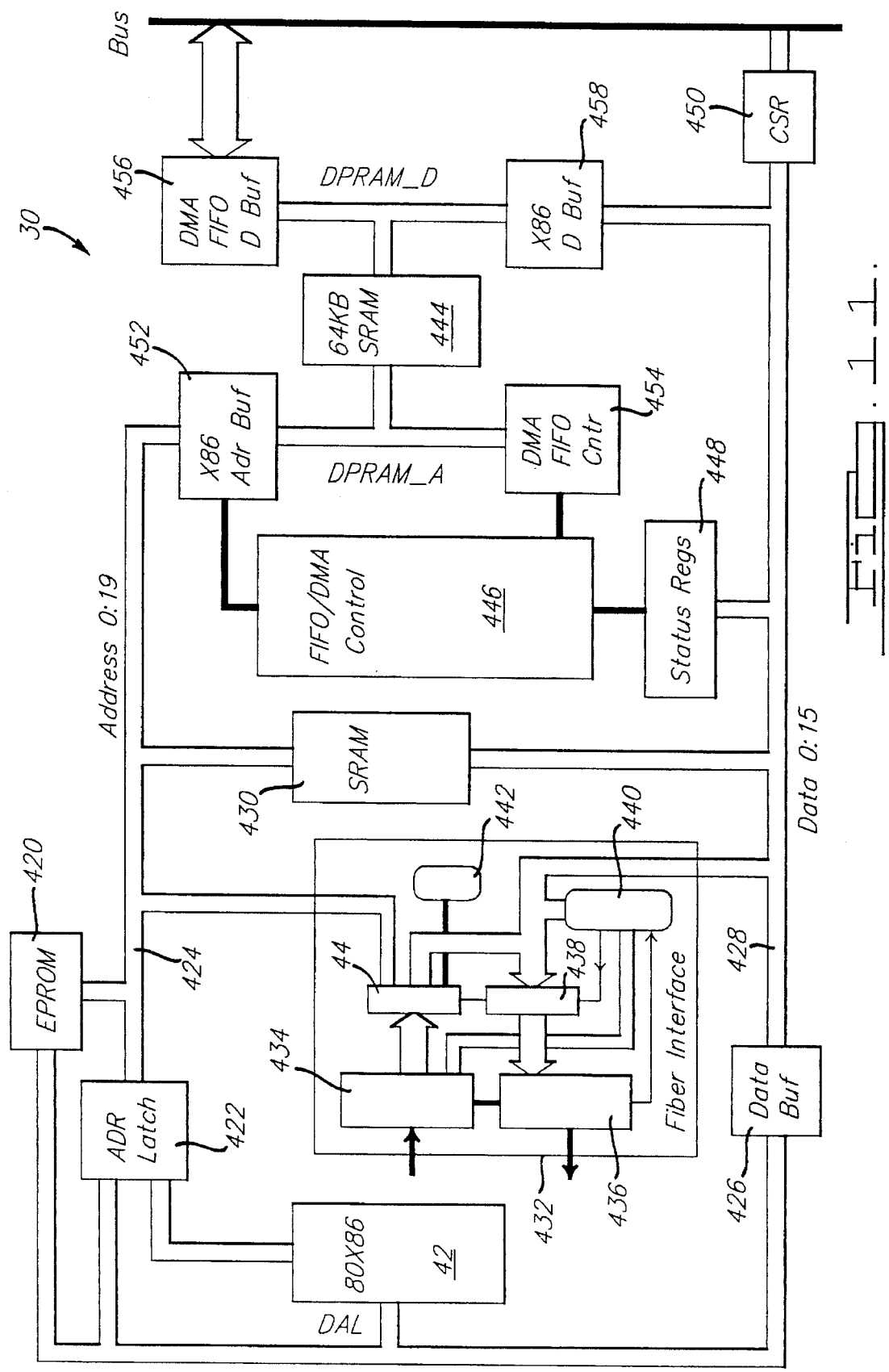

SYSTEM AND METHOD FOR DETERMINING WHETHER TO TRANSMIT COMMAND TO CONTROL COMPUTER BY CHECKING STATUS OF ENABLE INDICATOR ASSOCIATED WITH VARIABLE IDENTIFIED IN THE COMMAND

This is a division of U.S. patent application Ser. No. 08/279,697, filed Jul. 25, 1994, now U.S. Pat. No. 5,428, 745, which is a Continuation of application Ser. No. 08/191, 766, filed Feb. 4, 1994, abandoned, which is a Continuation of application Ser. No. 07/898,923, filed Jun. 12, 1992, abandoned.

BACKGROUND OF THE INVENTION

The present invention generally relates to "front-end" communication techniques between process control computers and a plant/local area network. More specifically, the present invention relates to a front-end communication system which is capable of securely handling messages from the plant area network which could affect the operation of a process control computer.

In chemical manufacturing plants and other relatively large processing plants, a network of control computers and operator workstations may be needed to achieve automated control of an ongoing physical process in the plant. For example, the Jones et. al U.S. Pat. No. 4,663,704, issued on May 5, 1987, shows a distributed processing system for a plant in which a single data highway connects all the various input/output terminals, data acquisition stations, control devices, record keeping devices and so forth. Similarly, the Henzel U.S. Pat No. 4,607,256, issued on Aug. 19, 1986, shows a plant management system which utilizes a plant control bus for the purpose of transmitting data to physical computer modules on the network.

In some of these process control computer networks, redundant process control computers are employed to enhance the reliability of the plant control and monitoring system. For example, the Fiebig et. al U.S. Pat. No. 5,008, 805, issued on Apr. 16, 1991, shows a networked control system which includes a "hot standby" redundant processor that synchronously processes a control schedule table for comparison with control messages from a sender processor that are transmitted on the network. The redundant listener processor maintains a duplicate configuration in its memory ready to take over control of the system in the event of a failure of the sender processor. As another example, the McLaughlin et. al U.S. Pat. No. 4,958,270, issued on Sep. 18, 1990, shows a networked control system which employs a primary controller and a secondary controller. In order to maintain consistency between the primary data base and a secondary image of the data base, only predetermined areas changed are updated as a way of increasing the efficiency of the update function. Similarly, the Slater U.S. Pat. No. 4,872,106, issued on Oct. 3, 1989, shows a networked control system which employs a primary data processor and a back-up data processor. Normally, the back-up processor will be in a back-up mode of operation, and it will not operate to exercise control over the input/output devices or receive data concerning the states of the input/output devices. Accordingly, control over the input/output devices is exclusively carried out by the primary processor. However, the primary processor periodically transfers status data relating to its operation in the control of the input/output devices to the back-up data processor via a dual ported memory connected between the two processors.

In contrast with the above networked control systems, another control technique for redundant process control computers exists in which both of the process control computers operate on input data and issue control commands to the same output devices. This type of control technique may be referred to as active redundancy, because each of the redundant process control computers operate independently and concurrently on common input data. A discussion of this type of control technique may be found in the Glaser et. al U.S. patent application Ser. No. 07/864,931, filed on Mar. 31, 1991, mow U.S. Pat. No. 5,428,769entitled "Process Control Interface System Having Triply Redundant Remote Field Units". This application is hereby incorporated by reference.

The use of active redundancy as a control technique presents a difficult problem in terms of communication with the plant computer network, as each actively redundant process control computer will receive a set of input values and each of these process control computers will generate a set of output values. In the case where the actively redundant process control computers arbitrate or resolve some or all of the input and/or output values, to the extent that differences do exist, then multiple sets of input and output values could be created. For example, a set of pre-arbitration and post-arbitration input data values could potentially be available from each of the actively redundant process control computers. Accordingly, it would be desirable to enable some or all of these data sets to be matched up and analyzed by another computer on the plant network without interfering with or slowing down the operation of the actively redundant process control computers.

Additionally, it would be desirable to permit one or more of the computers on the plant network to modify certain values used by the program in each of the actively redundant process computers as the need may arise, such as analog constants. However, it should be appreciated that such an activity would need to be restricted in some manner, as predictable changes in the operation of physical devices should be assured.

Accordingly, it is a principal objective of the present invention to provide a secure front-end communication system and method for controlling signals transfers between an actively redundant process control computer and a plant/local area network.

It is another objective of the present invention to provide a secure front-end communication system which is capable of evaluating an instruction from the plant/local that could affect the operation of the actively redundant process control computer.

It is also an objective of the present invention to provide a secure front-end communication system which insures that there is proper alignment with the operating program in the actively redundant process control computers.

It is a further objective of the present invention to provide a secure front-end communication system which enables one of the actively redundant process control computers to receive a revised operating program without adversely affecting the operation of the other actively redundant process control computer.

It is an additional objective of the present invention to provide a secure front-end communication system and method which is capable of utilizing a plurality of different communication protocols and encryption techniques depending upon the type of message being transmitted.

SUMMARY OF THE INVENTION

To achieve the foregoing objectives, the present invention provides a secure front-end communication system which is interposed between a plurality of actively redundant process control computers and a computer network. The secure front-end communication system includes a front end computer which is capable of establishing time limited communication contracts with one or more computer entity on the computer network. In accordance with the method of the present invention, each of these time limited communication contracts is based upon an acceptable response to the transmission of an unpredicable signal from the front end computer. More particularly, the acceptable response is preferably in the form of an encrypted transformation of a psuedo-random number generated by the front end computer. Additionally, before the time limited communication contract expires, the front end computer will negotiate a new time limited communication contract with the computer entity on the computer network using a new psuedo-random number.

In one form of the present invention, the front end computer also includes at least one permissive table which is used to determined whether a write command message from the network entity should be transmitted to the process control computer for which the message was intended. A security server is also included on the computer network for transmiting a security table to the front end computer. The security table is used to identify the network entities that are permitted to send write command messages to the process control computers to which the front end computer is connected.

Additional features and advantages of the present invention will become more fully apparent from a reading of the detailed description of the preferred embodiment and the accompanying drawings in which:

BRIEF DESCRIPTION OF THE DRAWINGS

FIG. 3 is a block diagram of the stealth interface shown in FIG. 1.

FIG. 7 is a block diagram of the application software for the front end computers shown in FIG. 1.

FIG. 10 is a block diagram of the IFS circuit shown in FIG. 1.

FIG. 11 is a block diagram of the IFQ circuit shown in FIG. 1.

DETAILED DESCRIPTION OF THE PREFERRED EMBODIMENTS

Figure 1:
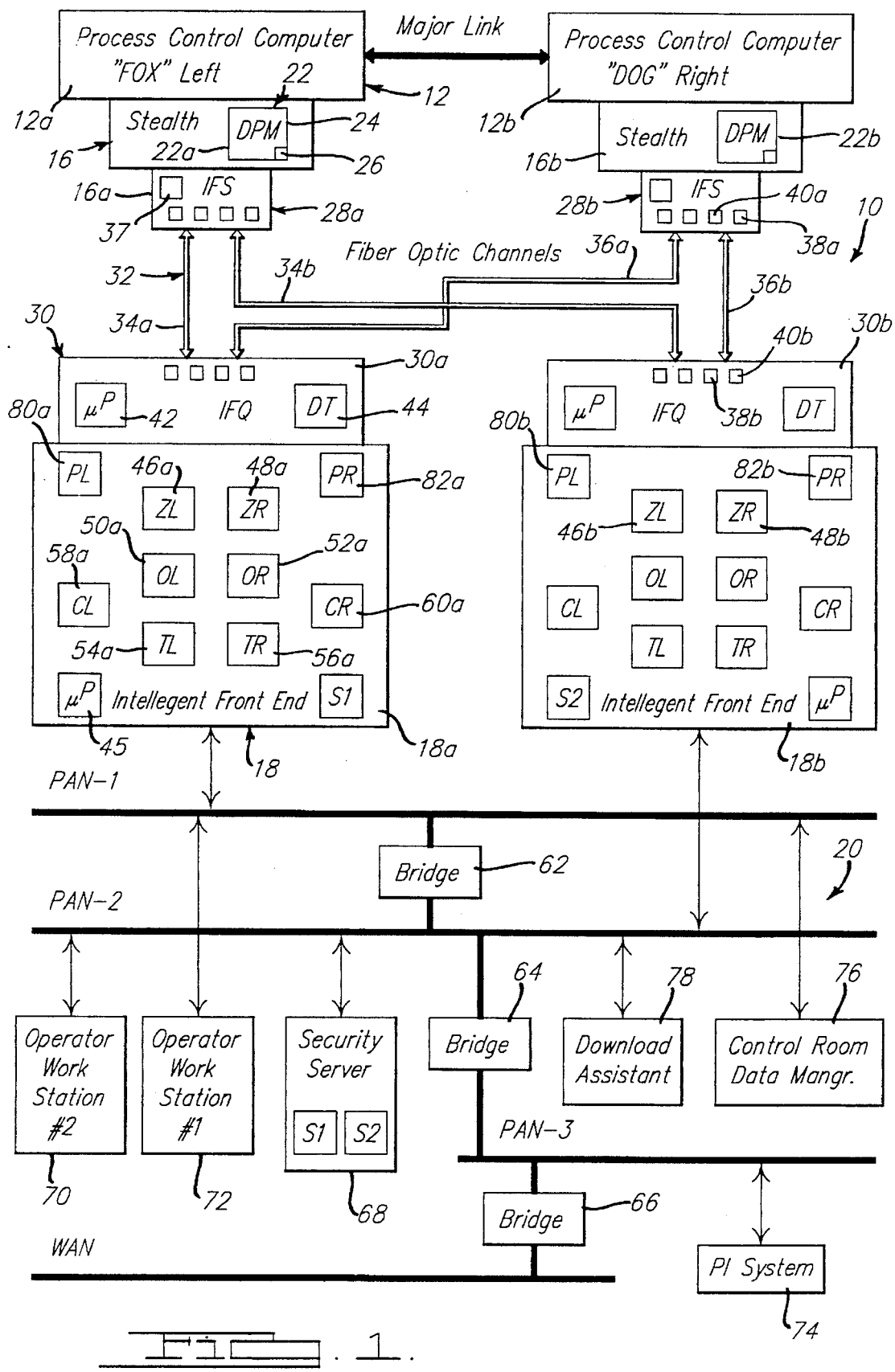
FIG. 1 is a block diagram of an intelligent front-end communication system for a plurality of actively redundant process control computers which utilizes a stealth interface according to the present invention.

Referring to FIG. 1, a block diagram is shown of an intelligent front-end communication system 10 which is coupled to a pair of actively redundant process control computers 12a–12b. Each of the process control computers 12a–12b receive common input data from field computer units (not shown) or other suitable field instrumentation. In this regard, the Glaser et al. U.S. patent application Ser. No. 07/864,931, now U.S. Pat. No. 5,428,769, referenced above, describes in detail the communication and control links between a pair of actively redundant process control computers, such as process control computers 12a–12b, and the input/output devices directly associated with the physical process being controlled.

While the redundancy of two actively operating process control computers has certain fault tolerance advantages over a single decision making process control computer, it should be understood that the principles of the present invention are not limited to any particular configuration of process control computers. Thus, for example, it may be desirable to employ three process control computers in the place of the two process control computers 12a–12b shown in FIG. 1 under the appropriate circumstances.

In the present embodiment, the process control computers 12a–12b preferably operate concurrently on all of the signals transmitted from one or more field computer units. In other words, each of the process control computers 12a–12b are capable of making independent decisions based upon the data received by these redundant computers from the field. The decisions made by the process control computers 12a–12b determine the output signal values which are ultimately directed to specific output devices (e.g., valves, pump motors and reactor heaters) by the appropriate field computer units. While the output signal values are preferably reconciled at least to some extent between the two actively redundant process control computers 12a–12b before the transmission of these signals to the field, it should be understood that two independent sets of output signal values could be communicated to the field computer units. In this regard, the input values received from a field computer unit could be arbitrated, which should make it unnecessary to reconcile or arbitrate output values. This is because both of the process control computers 12a–12b would then be working with the same process control program and operating on the same set of arbitrated input values.

As an example of a preferred form of possible value reconciliation, corresponding input value tables in each of the process control computers 12a–12b could be compared during a preset time period, and one of the values could be chosen for each input value signal to be subjected to the process control program. This selection of input values could be made on a suitable criteria to the process being controlled, such as the use of the value determined by the Left process control computer 12a when the value determined by the Right process control computer 12b is within a certain predetermined percentage limit (e.g., 2.5%). Otherwise, the distinct input values of both the Left and Right process control computers could each be employed when these values are found to be outside the predetermined percentage limit. Alternatively, the selection of different input/output values from the Left and Right process control computers could be made on the basis of a software implemented preference. Thus, for example, under certain process conditions, it may be considered more appropriate to select either the high or low value, regardless of whether the value was determined by the Left or Right process control computer.

To facilitate this arbitration or reconciliation process, a parallel communication link 14 is provided between the process control computers 12a–12b. Parallel communication link 14 is referred to as the "major" link, as it permits a direct transfer of data and timing signals between the process control computers. It should also be noted that the Left process control computer 12a is labeled "fox", while the Right process control computer 12b is labeled "dog". These are logical designations for alternative operating modes of the process control computers 12a–12b.

While each of the process control computers 12a–12b make independent decisions, which may be subject to arbitration, the process control computer currently in the fox mode has the ability to force the process control computer in the dog mode to move to a subsequent step in a programmed sequence in order to keep the cooperative efforts of the two process control computers in relative synchronization. Additionally, the process control computer in the fox mode will transmit a timing signal to the process control computer in the dog mode at the beginning of its process control program cycle (e.g., a one second period), so that the process control computer in the dog mode will know to begin a new process control program cycle as well. As the process control computers 12a–12b operate under their own clock oscillators, the detection and interpretation of this program cycle timing signal by the process control computer in the dog mode will help to periodically keep these process control computers in relative synchronization. However, it should be appreciated that the program cycle of the process control computer in the dog mode will typically follow the program cycle of the process control computer in the fox mode by the period of time it takes to transmit and then detect the program cycle timing signal (e.g., 20-microseconds to 20-milliseconds).

In the event that process control computers 12a–12b are temporarily not able to communicate over the major link 14, each of these process control computers will continue their operations in a mode which assumes that they are operating alone. In this mode of operation, it should be appreciated that the program cycles of the process control computers 12a–12b may gradually drift apart in time relative to each other. Nevertheless, as will be seen from the discussion below, the front end communication system 10 is designed to enable data received from the process control computers 12a–12b to be time aligned for real-time analysis.

As illustrated in FIG. 1, each of the process control computers 12a–12b includes a stealth interface according to the present invention. In particular, process control computer 12a includes stealth interface circuit 16a, while process control computer 12b includes stealth interface circuit 16b. As the stealth interface circuits 16a–16b comprise identical circuits, these stealth interface circuits are sometimes referred to generally herein as stealth interface circuit 16. Due to the redundant nature of the front end communication system 10, a general reference number will also be used for other duplicative components in the system.

The stealth interface 16 provides transparent data transfers between the process control computer to which it is connected and external communication devices. In this regard, the data transfers are transparent to the process control computer 12 in that the operation of the process control computer is not delayed or otherwise adversely affected by a transfer of its data to one or more external communication devices. The stealth interface 16 also enables the transfer of messages from an external communication device without affecting the operation of the process control computer 12. The primary example of such an external communication device is shown in FIG. 1 to be comprised of a pair of redundant front end computers 18a–18b. The front end computers 18a–18b are redundant, because communication paths are provided for enabling each of these front end computers to exchange data and messages with both of the stealth interface circuits 16a–16b.

Each of the front end computers 18a–18b provide a highly intelligent interface between the stealth interface circuits 16a–16b and a plant/local area network, which is generally designated by reference numeral 20. However, since each of the redundant front end computers 18a–18b are capable of communicating with each of the stealth interface circuits 16a–16b, it should be appreciated that this redundancy is not required, and that a single front end computer could be utilized in the appropriate application. Additionally, as will be more apparent from the discussion below, each of the stealth interface circuits are capable of exchanging data and messages with other external communication devices, as well as the front end computers 18a–18b.

As illustrated in FIG. 1, the stealth interface circuit 16 features a dual-ported memory "DPM" 22 which resides on the bus structure of the process control computer 12. Indeed, in the embodiment disclosed herein, the dual-ported memory 22 provides the primary or only data memory for the process control computer 12. Thus, in accordance with the present invention, the stealth interface circuit 16 will selectively grant external devices direct access to the data memory of the process control computer itself. The dual-ported memory 22 includes an internal port which is connected to the bus structure of the process control computer 12 and an external port, which is sometimes referred to herein as the stealth port. While the dual-ported memory 22 could be configured to provide additional ports, the dual-ported memory preferably includes an arbitration circuit which enables a plurality of external communication devices to have alternative access to the stealth port. In other words, only one external device will be able to use the data and address lines of the stealth port at any given time when access to the dual-ported memory is permitted through the stealth port, even though more than one external device may ultimately be coupled to the data and address lines of the stealth port. In the present embodiment, the stealth interface arbitration circuit employs a tint-come, first-serve approach to granting access rights.

However, in accordance with the present invention, this arbitration circuit operates only on the stealth port. There is no arbitration per se between the internal and external ports of the stealth interface circuit 16. Rather, access to the dual-ported memory 22 from the external/stealth port is available only during those times when the process control computer 12 cannot access the dual-ported memory. More specifically, in the form of the invention disclosed herein, the machine cycle of the process control computer 12 is utilized to control access to the dual-ported memory 16. As is well known, the central process unit of any computer must fetch and decode one or more programmed instructions in order to operate on one or more data words. In computers based upon the yon Neumann architecture, it typically takes several computer clock cycles to fetch, decode and execute an instruction. However, in the present embodiment, the process control computer 12 is based on the Harvard architecture, which permits both an op-code instruction and the operand data for this instruction to be fetched in the same clock cycle. This is because a computer based upon the Harvard architecture includes physically separate instruction and data stores, and each of these stores have their own address and data lines to the central processing unit. Thus, during the portion of the clock cycle for the process control computer 12 that is devoted to fetching and decoding an instruction, the dual-ported data memory 22 may be accessed from the stealth port. Then, during the portion of the clock cycle for the process control computer 12 that is devoted to fetching the operand from the data store, the process control computer will have access to the dual-ported data memory 22 from the internal port.

In accordance with the present invention, the stealth interface circuit 16 watches for a specific transition in the memory clock signal of the process control computer 12 in order to determine when the stealth port may have access to the dual-ported data memory 16. In this regard, it should be understood that the process control computer itself is not affected by this external access, as external access is permitted by the stealth interface circuit 16 only during those time periods when the process control computer 12 will not need to access the dual-ported data memory 22. Indeed, the process control computer 12 does not even have to know that externally generated read/write activity is actually occuring with respect to its data store. Nevertheless, in accordance with the present invention, an important distinction is made between the ability to "read" from the dual-ported data memory 22 and the ability to "write" to the dual-ported data memory, as far as the stealth port is concerned. While it may be desirable to enable an external communication device to read each and every memory location in the dual-ported data memory 22, this may not be true with respect to the ability of an external device to write to memory locations in the dual-ported memory. In this regard, the dual-ported data memory 22 will store not only dynamic data associated with the physical process being controlled, but it may also store other process control variables, such as analog and digital constants.

Accordingly, the dual-ported memory 22 includes two "logical" memory sections, namely variable section 24 and mailbox section 26. These memory sections are logically distinct, because they are treated separately, even though they may both reside in the same physical memory circuit chip or chip set. In the present embodiment, the mailbox section 26 is comprised of a set of 256 memory word locations (16 bits each) in the dual-ported data memory 22, and the variable section 24 is comprised of the remaining memory locations in the dual-ported data memory 22 (e.g., a block of 64 k memory word locations). The variable section 24 may also include a message area for holding system messages from the process control computer 12 to the front end computer 18. The mailbox section 26 is used to provide a specific region in memory for storing messages from external devices, such as the front end computers 18a–18b. In this regard, it should be appreciated that the memory locations of the mailbox section 26 do not need to be physically contiguous. While the mailbox section 26 may be configured to hold more than one message at any one time, depending upon the message transmission protocol employed, the mailbox section need only be large enough to hold one complete message. These messages may be as simple as an external request for the process control computer 12 to gather and transmit health/status data from a remote field computer unit that it may obtain less frequently. A message may also include a command to change a particular variable stored in the dual-ported data memory 22. Additionally, the mailbox section 26 of the dual-ported data memory 22 may also be used to electronically convey a program revision to the process control computer 12.

As will be more fully discussed below, the stealth interface circuit 16 includes a guardian circuit which prevents any external entity from writing to any memory locations in the variable section 24 of the dual-ported data memory 22. Thus, while some or all of the memory locations in the dual-ported data memory 22 may be read from the stealth port, an external entity is only permitted to write to the memory locations in the mailbox section 26 of the dual-ported memory 22. This feature of the present invention provides a hardware safe-guard at the process control computer 12 which insures that no external entity will be able to inadvertently interfere with the data processing operations of the process control computer 12. As will be more apparent from the discussion below, this feature of the present invention could also be employed to grant or deny external write access to any particular memory location or set of memory locations in the dual-ported data memory 22.

In order to rapidly pump data into or out from the stealth port, the front end communication system 10 of FIG. 1 is also shown to include an interface to stealth "IFS" circuit 28, an interface to Q-bus "IFQ" circuit 30, and a set of fiber optic cables 32 interposed therebetween. The IFS circuit 28 is connected to the stealth port of the dual-ported data memory 22, while the IFQ circuit 30 resides on the "Q bus" of the front end computer 12. Due to the redundant nature of the front end communication system 10, it should be appreciated that the IFS circuit 28a is connected to the stealth port of dual-ported data memory 22a, while IFS circuit 28b is connected to the stealth port of dual-ported data memory 22b. Similarly, the IFQ circuit 30a is connected to the Q bus of the front end computer 18a, while the IFQ circuit 30b is connected to the Q bus of the front end computer 18b. In the embodiment disclosed herein, the front end computer 18 is preferably comprised of a MICROVAX 3400 computer using the real-time ELN operating system from the Digital Equipment Corporation "DEC". While the VAX family of computers from DEC offer considerable speed and networking advantages, it should be appreciated that other suitable front end computers may be employed in the appropriate application.

In order to permit each of the front end computers 18a–18b to conduct bi-directional communications with both of the stealth interface circuits 16a–16b, the fiber optic cables 32 actually include two sets of send and receive optical fibers (e.g., 62.5/125/0,275NA type fibers). However, the separate send and receive optical fibers for each of the front end computers 18a–18b are represented as single channels in FIG. 1 for simplicity. Thus, fiber optic channel 34a includes a separate optical fiber for sending information from the front end computer 18a to the stealth interface circuit 22a and an optical fiber for receiving information from the stealth interface circuit 22a. Similarly, the fiber optic channel 36a includes a separate optical fiber for sending information from the front end computer 18a to the stealth interface circuit 22b and an optical fiber for receiving information from the stealth interface circuit 22b. This arrangement of optical fibers is also duplicated for the front end computer 18b.

In the present embodiment, the combination of the IFS circuit 28, the IFQ circuit 30 and the fiber optic cables 32 provide an optical transmission interface which permits the front end computers 18a–18b to be remotely located from the process control computers 12a–12b. For example, in this embodiment it is possible for the front end computers 18a–18b to be located up to 2 km from the process control computers 12a–12b. Additionally, it should be noted that the Fiber Distributed Data Interface "FDDI" protocol may be used to transmit information between the IFQ and IFS circuits over the fiber optic cables 32.

The IFS circuit 28 includes the appropriate address and data buffer circuits (not shown) for transferring information to and from the stealth port of the dual-ported data memory 22. The IFS circuit 28 also includes a transfer map 37 which enables data from selected locations in the dual-ported data memory 22 to be gathered and transferred as one contiguous block of data. The transfer map 37 may be comprised of a static RAM with sufficient address storage capability to gather data from all of the available memory locations in the dual-ported data memory 22.

Additionally, the IFS circuit 28 includes a separate transmitter and receiver circuit for each of the two front end computers 18a–18b, such as transmitter 38a and receiver 40a. The transmitter 38a is adapted to convert parallel data words (e.g., 16 bits) from the stealth port into a serial bit stream suitable for transmission over one of the fiber optic cables 32. Similarly, the receiver 40a is adapted to convert a serial bit stream from the front end computer 18 into a parallel data word for transmission to the stealth port through one or more of the IFS circuit buffers. A corresponding set of transmitters and receivers are also provided in the IFQ circuit 30, such as transmitter 38b and receiver 40b. From the above, it should be appreciated that the use of two sets of transmitter-receiver pairs enables data to be transferred and/or received simultaneously between both of the IFS circuits 28a–28b and both of the IFQ circuits 30a–30b. Thus, for example, the IFS circuit 28a is capable of simultaneously transmitting data acquired from the process control computer 12a to both of the front end computers 18a–18b.

While not shown for illustration simplicity, it should be appreciated that a laser or LED light source is interposed between each of the transmitters (e.g., transmitters 38a–38b) and their respective optical fibers. Similarly, a photo-detector is also interposed between each of the receivers (e.g., receivers 40a–40b) and their respective optical fibers. For example, these light converters may be comprised of a pair of AT&T ODL200 series converters. While fiber optic cables are preferred for their speed, low error rate and security advantages over mediums such as coaxial cable, it should be understood that that other suitable data transmission medium could be employed in the appropriate application.

In the present embodiment, the transmitters and recievers in the IFS and IFQ circuits are preferably comprised of a high-performance Gallium Arsenide chipset, such as the "Gazelle" GA9011 transmitter and GA9012 receiver from Triquint Semiconductor, Inc., 2300 Owens St., Santa Clara, Calif. These particular transmitters and receivers permit data transmission rates in excess of 200 Mbits/second. These transmitters and receivers utilize a 40-bit wide parallel bus which enables data to be encoded into a 50-baud word using FDDI-standard 4B/5B encoding. In this encoding, 4-bit data nibbles are translated into a 5-baud code symbol. Accordingly, the 4B/5B encoding produces ten 5-baud symbols from ten 4-bit data nibbles in order to comprise a data frame. The GA9011 transmitters also convert the serial stream from a Non-Return to Zero "NRZ" format to a Non-Return to Zero, Invert on ones "NRZI" format, which combines the transmission of data and clock signals into a single waveform. The NRZI waveform denotes a logical one with a polarity transition and a logical zero with no transition within the bit-time-frame. These logical ones and zeros are called bauds, and each group of five bauds are called a symbol. For example, a "0000" 4-bit binary input will be converted to a "11110" 5-baud binary symbol output, while a "1011" 4-bit binary input will be converted to a "10111" 5-baud binary symbol output.

The use of 4B/5B encoding and NRZI formating combine to substantially enhance the reliability of high-speed data transmissions over the fiber optic cables. The CA9012 receivers have built in clock and data recovery (e.g., NRZI to NRZ conversion), and they also monitor the incoming 5B symbols for validity. In this regard, the 4B/5B encoding creates a number of invalid symbols which may be checked for at the GA9012 receivers. As the presence of noise or jitter across the fiber optic link could cause one or more of the bauds to change to an unintented value, the detection of invalid symbols reduces the possibility of a transmission error going undetected.

As an additional layer of protection from potential errors, data transmissions from the IFS circuit 28 are formed into complete data frames, which are comprised of the data to be transferred (i.e., the 40-bit input data frame), a 16-bit destination address field, a 4-bit control code field and a 4-bit error detection code field. These complete data frames are preferably separated from each other on the fiber optic link by at least one sync frame. As potential physical link errors may have a burst or clustering nature, the error code needs to be able to detect up to four contiguous bit errors. In this regard, a Longitudinal Redundancy Check "LRC" code is employed to prevent masked errors from potentially corrupting subsequent data processing operations. This type of error code is also referred to as a "Longitudinal Parity Check". In a LRC code, a 4-bit nibble composed of parity bits is generated and inserted into the encoded data stream for a predetermined number of data nibbles in the encoded data stream, as shown below:

|  | b4 b3 b2 b1 |
| --- | --- |
| data nibble 1 | \| x x x x \| |
| data nibble 2 | \| x x x x \| |
| data nibble 3 | \| x x x x \| |
| ⋮ | ⋮ |
| data nibble 8 | \| x x x x \| |
| data nibble 9 | \| x x x x \| |
| data nibble 10 | \| p4 p3 p2 p1 \| | where $p_i = b_{i1}$ Xor $b_{i2}$ Xor ... Xor $b_{i9}$, and i=bit location 1 to 4. Thus, the ith bit of this parity check character checks the ith information bit position in data nibbles 1 through 9 under even parity conditions. The combination of the LRC error checking, the 4B/5B encoding and the NZRI conversion enable the front end communication system 10 to provide a targeted Baud Error Rate "BER" of 1E-12. While a Cyclic Redundancy Check "CRC" code could be employed in lieu of the LRC code, the more complicated CRC code would also increase the complexity of the IFQ and IFS circuits. Additionally, the LRC coding more readily permits dual fiber optic channel signal transmissions between the IFS and IFQ circuits, and the intrinsic sychronization features of the the Gazelle transmitters 38a–38b and receivers 40a–40b may be used to frame the LRC based protocols.

The IFQ circuit 30 includes a microprocessor 42 (e.g., an Intel 80186 chip) which provides the data pump for the front end computer 18. The microprocessor 42 is not only responsible for all IFQ/IFS protocol control and relaying data from the process control computers 12a–12b to a destination on the network 20, but it is also responsible for controlling the integrity of write activities to the IFS and IFQ circuits. For example, the microprocessor 42 may be used to program the transfer map 37 in the IFS circuit 28, so that only a particular sub-set of data in the dual-ported data memory 22 may be gathered and transmitted to the front end computer 18, if less than all of the available variables (e.g., input/output values, alarms and events) is desired. In this way, the actual contents of the transfer map 37 may be dependent upon a specific process control application.

All signal transmissions between the IFQ circuit 30 and the IFS circuit are under the control of IFQ circuit microprocessor 42. In this regard, there are three types of data transmissions from the IFQ circuit 30 to the IFS circuit 28, namely "load transfer map", "send command messages" and "receive data". The load transfer map transmission will enable the IFQ circuit 30 to load the transfer map 37 of the IFS circuit 28 with the specific variable addresses which will steer the data memory transmit bursts from the IFS circuit. The receive data transmission will cause the IFS circuit 28 to return the requested segment of memory from the dual-ported data memory 22.

A command message transmission will start with a Write-Lock request to the IFS circuit 28. Assuming that incoming buffer is free, the IFS circuit 28 will assert a Write-Lock on the mailbox section 26 of the dual-ported data memory 22, and return a positive acknowledgement to the IFQ circuit 30. The IFQ circuit 30 may then transmit its message with the assurance that no other device will be able to write to the mailbox section 26 until its message has been completely stored and preferably read by the process control computer 12. However, a time limit may be imposed on the Write Lock to ensure that the flow of communications is not impeded by one of the external entities connected to the stealth interface circuit 16. It should also be appreciated that message transmissions should not take place during any time in which a data burst should be received from the IFS circuit 28.

As another measure of data transmission protection, the IFQ circuit 30 will cause the IFS circuit 28 to read back a message transmitted to and stored in the mailbox section 26 of the dual-ported data memory 22 in order to be sure that the message was transmitted and stored correctly. Once the IF circuit 30 determines that the message has been accurately received and stored, then the IFQ circuit will cause a flag to be set which will signal the process control computer 12 to pick up the new message. In the event that this data verification fails, then the entire message transmission process will be repeated.

The IFQ circuit 30 also includes a process data buffer 44, which is shown as block in FIG. 1 for illustration simplicity. However, the process data buffer 44 should include sufficient memory capacity to store a separate data table for each of the process control computers 12a–12b (e.g., 262,144 bytes). Each of these data tables will include both the SDSS and DSS data transmissions. Additionally, a DMA buffer (not shown) may also be provided to allow some elasticity in processing the data being received. In this regard, it should be noted that both the IFS circuit 28 and the IFQ circuit 30 are configured to facilitate bi-directional Direct Memory Access "DMA" transfers between the IFQ circuit 30 and the Q-bus of the front end computer 18. In this way, the central processing unit 45 of the front end computer 18 does not need to devote substantial time to processing data transfers to and from the IFQ circuit 30. Accordingly, the DMA buffer is preferably used as a bucket brigade area to perform DMA transfers on blocks of data from the process data buffer 44 (e.g., 8K bytes at a time) to a suitable memory residing on the Q-bus of the front end computer 18.

The use of DMA transfers also enhances the ability of the front end communication system 10 to achieve the goal of making available real-time data from the process control computers 12a–12b to one or more computers on the network 20. More specifically, the front end communication system 10 is designed to request, receive and answer network queries on both pre-link and post-arbitrated data from each of the process control computers 12a–12b within a one-second time resolution. For example, in this particular embodiment, each of the process control computers 12a–12b will issue a Sequence Data Stable Strobe "SDSS" signal in every one-second program cycle, which indicates that approximately 1024 (16 bit) words of pre-link dynamic analog/digital input data is stable and available in the dual-ported data memory 22. This specific data set is referred to as pre-link data, as this data has not yet been arbitrated between the process control computers 12a–12b via data transmissions across the major link 14. Subsequently, in the same one-second program cycle, each of the process control computers 12a–12b will issue a Data Stable Strobe "DDS" signal, which indicates that a complete set of post-arbitrated input and output data is stable and available in the dual-ported data memory 22. This data set is referred to as post-arbitrated, as the input values will have been arbitrated or resolved by this point in the program cycle. In the present embodiment, this post-arbitrated data set may be comprised of up to 65,536 (16-bit) words, as it will include both input and output values (and any other variables stored in the dual-ported data memory 22).

It should also be noted at this point that one of the first functions in the program cycle of the process control computers 12a–12b is to make output value decisions from the post-arbitrated input data obtained in the immediately preceding program cycle. Accordingly, it should be appreciated that the post-arbitrated data set will include the arbitrated input values from the current program cycle and the output values from the immediately previous program cycle.

It is also important to understand that the function of obtaining a copy of the pre-link and post-arbitrated data sets cannot be permitted to delay the operations of the process control computers 12a–12b. Thus, for example, the front end communication system 10 must be sufficiently fast to obtain a copy of the pre-link data sets before the process control computers 12a–12b need to have the ability to change one or more of these data values through the arbitration process. Accordingly, in the context of the present embodiment, the front end communication system 10 needs to be able to acquire a pre-link data set within ten milliseconds of the time that the SDSS signal was initially asserted in order to have the assurance of data stability. Similarly, the front end communication system 10 needs to be able to acquire a post-arbitrated data set within fifty milliseconds of the time that the DSS signal was initially asserted. In this regard, it should be appreciated that each of these data sets need to be independently acquired from both of the process control computers 12a–12b by each of the front end computers 18a–18b. Additionally, each of the front end computers 18a–18b must also be able to send messages to the one or both of the process control computers 12a–12b during time periods outside of the SDSS and DSS data acquisition windows.

In order to further faciliate the ability of the front end communication system to acquire the SDSS and DSS data sets without any data transfer blocknecks, and also provide the ability to group and time align the data sets being received, each of the front end computers 18a–18b includes a set of at least three reflective buffers for each of the process control computers 12a–12b. Each of these logically distinct reflective buffers or shadow memories may reside in the same physical memory chip or chip set in the front end computer 18. As shown in FIG. 1, the set of reflective buffers contained in the front end computer 18a is generally comprised of a ZERO buffer "ZL" 46a for the Left process control computer 12a, a ZERO buffer "ZR" 48a for the Right process control computer 12b, a ONE buffer "OL" for the Left process control computer, a ONE buffer "OR" for the Right process control computer, a TWO buffer "TL" for the Left process control computer, and a TWO buffer "TR" for the Right process control computer. Additionally, it should be understood that a corresponding set of reflective buffers are contained in the front end computer 18b, such as the ZERO buffer "ZL" 46b for the Left process control computer 12a and the ZERO buffer "ZR" 48b for the Right process control computer 12b.

The IFQ circuit 30 writes to these left and right buffers in a "round robin" fashion using DMA data transfers. In other words, the IFQ circuit 30 will fill the ZERO buffer 46a with pre-link and post-arbitrated data of a particular process control cycle from the Left process control computer 12a. Then, when pre-link and post-arbitrated data for the next process control cycle is received from the Left process control computer 12a, the IFQ circuit will increment to the ONE buffer 50a in order to store this data. Similarly, the IFQ circuit 30 will turn to the TWO buffer 54a when pre-link and post-arbitrated data for the third process control cycle is received from the Left process control computer 12a in order to store this data. Then, when pre-link and post-arbitrated data for the forth in time process control cycle from the Left process control computer 12a is to be stored, the IFQ circuit 30 will return to address the ZERO buffer 46a for data storage. Of course, it should be appreciated that the IFQ circuit 30 will employ the same round robin sequence for individually transfering pre-link and post-arbitrated data to the three reflective buffers 48a, 52a and 56a that are used for the Right process control computer 12b.

For purposes of illustration, FIG. 1 shows three reflective memory buffers (46a, 50a and 54a) for the Left process control computer 12a, and three reflective memory buffers (48a, 52a and 56a) for the Right process control computer 12b. However, as the SDSS and DSS data transfers are treated as independent DMA events, the reflective memory buffers preferably include distinct reflective memory buffers for each of these events. Accordingly, a total of twelve reflective memory buffers are preferably provided in the front end computer 18. Additionally, each of these reflective memory buffers are individually tracked, so that the ordering of these buffers do not necessarily have to follow the regimen shown below:

Second N: (ZERO-SDSS-L ZERO-DSS-L ZERO-SDDS-R ZERO-DSS-R)

Second N+1: (ONE-SDSS-L ONE-DSS-L ONE-SDSS-R ONE-DSS-R)

Second N+2 (TWO-SDSS-L TWO-DSS-L TWO-SDDS-R TWO-DSS-R)

Rather, the ordering of these buffers could also proceed under other regimens, such as shown below:.

Second N: (ONE-SDSS-L TWO-DSS-L ZERO-SDSS-R ONE-DSS-R)

Second N+1: (TWO-SDSS-L ZERO-DSS-L ONE-SDDS-R TWO-DSS-R)

Second N+2 (ZERO-SDSS-L ONE-DSS-L TWO-SDDS-R ZERO-DSS-R)

It is important to understand that the corresponding left and right reflective buffers (e.g., buffers 46a and 48a) will generally not become filled at the same time, as the program time line of the process control computer in the dog mode should follow the program time line of the process control computer in the fox mode by a predeterminable period of time (e.g., 20-microseconds to 20-milliseconds). However, these time lines may become considerably separated in the event that communications across the major link 14 are not possible, as mentioned above. Even when the left and fight SDSS or DSS signals are asserted at near the same time, the delays required to transfer this information to the IFQ circuit 30 and then transfer this information into the appropriate reflective memories may result in a wider time skew between these events as seen by the application software of the front end computer 18 than as seen by the process control computer and IFS circuit hardware. Nevertheless, it is the responsibility of the front end computer 18 to ensure that the data sets ultimately made available to the computer network 20 represent data from the process control computers 12a–12b in the same program cycle (e.g., a one second period). In this regard, the application software of the front end computer 18 includes a procedure, referred to as "MI Sync", which groups individual data transfer events into a cohesive set of buffers that represent a "snapshot" of the pre-link and post-arbitrated data for a particular process control cycle.

The MI Sync procedure uses a set of reflective memory buffer management structures (MI_RMBMS) to track the status of incoming data transfers. When the IFQ circuit driver software signals to the MI Sync procedure that a DMA transfer has completed, MI Sync records the required information in the appropriate MI_RMBMS data structure. When MI Sync determines that a complete set of buffers has been received and stored (i.e., left SDSS, right SDSS, left DSS and right DSS), it updates a global data structure (MI_RM_DATA) with the pointers to the newly received data. These pointers are copied from the MI_RMBMS data structure. Accordingly, MI_RM_DATA includes the pointers to the currently available "complete" or time aligned set of reflective memory buffers. Depending upon where the front end computer 12 is in the round robin procedure, the most current time aligned set of reflective memory buffers may be TWO buffers 54a and 56a at one time interval, the ONE buffers 50a and 52a at the next time interval, and the ZERO buffers 46a and 48a at the following time interval. In the event that the SDSS or DSS data from one of the process control computers 12a–12b is not received by the IFQ circuit 30, MI Sync will still maintain time alignment by using an appropriate timeout (e.g., 700 milliseconds) for updating the MI_RM_DATA pointers. An indication will also be provided as to which buffer or buffers are unavailable.

The buffer pointers within MI_RM_DATA are protected by a mutual exclusion semaphore or "mutex". MI SYNC requests this mutex before copying the new pointers to MI_RM_DATA and releases it immediately after the copy is complete. When a network entity needs to access reflective memory data, a copy of the MI_RM_DATA pointers is made by requesting the mutex, copying these buffer pointers to a local data structure, and then releasing the mutex. Since the application for querying or reading the data uses a copy of the pointer, contention for the mutex is minimized, and MI Sync will be able to update MI_RM_DATA with new pointers as soon as the next complete set of data has been stored. In this regard, it is important to note that this method will enable the reading application to still access the same set of reflective memory buffers while MI Sync updates MI_RM_DATA with new pointers. Since reading applications will access the most current time aligned set of reflective memory buffers, it should be understood that a reading application could be accessing one set of reflective memory buffers (e.g., the TWO buffers 54a and 56a), while a subsequent reading application could be given access to another set of reflective memory buffers (e.g., the ONE buffers 50a and 52a) once MI Sync updates MI_RM_DATA with new pointers.

It should also be understood that applications which access the reflective memories will be able to run to completion before the referenced buffers are overwritten with new incoming data. In one embodiment of the front end communication system 10, applications requiring reflective memory data are assigned execution priorities high enough to allow them to run to completion in less than one second. However, it should be appreciated that the front end computer 18 could be configured with additional sets of buffers to allow the development of an application that may take longer to run to completion.

It should also be appreciated from the above that the use of the front end computers 18a–18b also enables the communication system 10 to have the necessary intelligence to answer specific data requests. The use of the front end computers 18a–18b also permit a rapid check to be made that the process control computers 12a–12b are in fact continuing to send realtime data. Additionally, the front end computers 18a–18b are also preferably programmed to make determinations as to whether read or write requests from the process control computers 12a–12b should be granted with respect to the entity on the computer network 20 which has forwarded the request. As will be discussed more fully below the front end computers 18a–18b contain both a security table and two permissive tables in their memories for facilitating these determinations. The security table is used to determine whether communications will be permitted at all with various entities on the computer network 20, while the permissive tables are used to evaluate write command messages from an entity on the computer network which could affect specific locations in the dual-ported data memories 22a–22b.

Figure 2A:
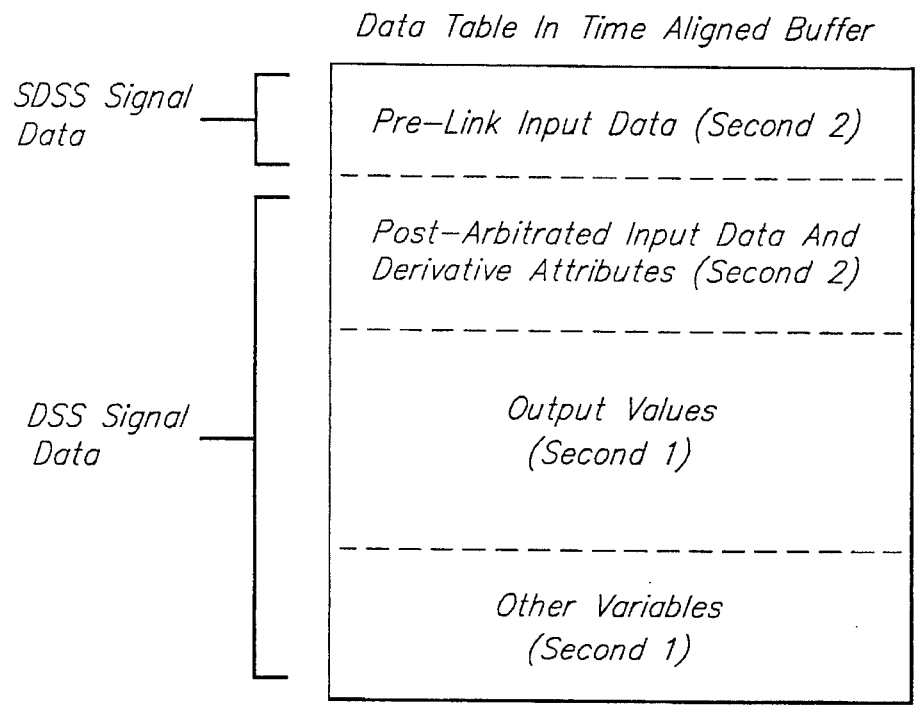
FIGS. 2A and 2B provide a diagrammatic representation of the data tables stored in a time aligned reflective memory buffer and the Correlate buffer shown in FIG. 1.
Figure 2B:
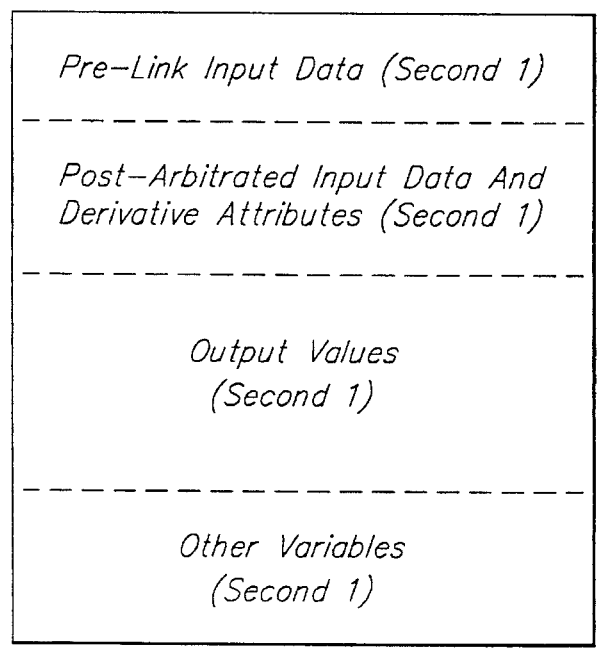

The front end computers 18a–18b may also utilize at least one set of additional reflective buffers, such as Correlate buffers 58a and 60a. In light of the fact that the DSS data set will contain the post-arbitrated input value data from the current program cycle and the output value data that was based upon the post-arbitrated input values of the immediately preceding program cycle, it may be desirable to correlate into one data table the output values for a particular program cycle with the input values used to decide these output values. Accordingly, the front end computer 18a may employ the Correlate buffers 58a and 60a to store a copy of the post-arbitrated input values from the current DSS data set, and then wait for the alignment of the next DSS data set in order to store a copy of the output values from this subsequent data set in the same Correlate buffers. In this regard, it should be appreciated that this copying procedure will be made from the most current time aligned set of reflective memory buffers. Thus, for example, FIG. 2A shows a diagrammatic example of a data table in a time aligned buffer, while FIG. 2B shows a similar example of a data table in the Correlate buffer CL. In any event, it should be understood that the time alignment capabilities of the front end computers 18a–18b provide a powerful diagnostic tool for analyzing both the operation of the process control computers 12a–12b and the physical process being controlled. For example, the arbitration performed with respect to the input data values may be analyzed for both of the process control computers 12a–12b, as pre-link and post-arbitrated input data values are time aligned and made available by the front end computers 18a–18b.

The computer network 20 is shown in FIG. 1 to generally include a direct control segment, a process information segment and a connection to a Wide Area Network "WAN". Each of these network segments preferably employ Ethernet compliant mediums and IEEE 802.3 compatible communication protocols. The direct control segment is comprised of dual Plant Area Networks "PAN-1" and "PAN-2", while the process information segment is comprised of Plant Area Network "PAN-3". At least one bridge 62 is used to interconnect the PAN-1 and PAN-2 segments. Additionally, at least one bridge 64 is used to interconnect the PAN-2 segment with the PAN-3 segment. Another bridge may be used to interconnect the PAN-1 segment with the PAN-3 segment. One or more bridges 66 may also be used to interconnect the PAN-3 segment with the WAN.

It should be noted that the front end computer 18a is coupled to the PAN-1 segment, while front end computer 18b is coupled to the PAN-2 segment. While a single plant area network could be provided, the use of dual plant area networks shown herein have certain communication and redundancy advantages over a single plant area network. In this regard, the bridges will typically filter communications by Ethernet hardware addresses to reduce the amount of traffic on each of the network segments. For example, a communication between the security server 68 and the operator station 70 will not be transmitted across the bridge 62 to the PAN-1 segment. The bridges 62, 64, 66 also provide a layer of physical separation between the network segments, so that if a fault occurs on one of the network segments, then the fault will be prevented from adversely affecting the other network segments. Additionally, one or more of the bridges are also used to filter communications on the basis of specific data communication protocol identifications to enhance the overall security of the network 20. For example, the bridge 64 may be used to prevent the transmission of messages employing the Ethernet compliant protocol used by the security server 68 from one of the PAN-2 and PAN-3 segments to the other. Similarly, the bridge 64 may be used to prevent the transmission of messages employing the Ethernet compliant protocol used to write information into the mailbox section 26 of the dual-ported data memory.

The computer network 20 also includes a plurality of operator workstations, such as operator workstations 70 and 72. As shown in FIG. 1, these operator workstations may be located on different network segments, and the number of operator workstations will be dependent upon the particular process control application. One or more of these operator workstations may be used to view or analyze data received from the front end computers 18a–18b. Additionally, these operator workstations may be used by an authorized control room operator to transmit the appropriate instructions to the front end computers 18a–18b which will cause a command message to be conveyed to the process control computers 12a–12b.

The network 20 further includes a process information computer 74 which may perform a variety of functions. For example, the process information computer may be used to store a history of process data received from the front end computers 12a–12b. Additionally, the process information computer 74 may be used to store the compilers needed to change the computer programs residing in the front end computers 18a–18b, as well as the programs residing in the process control computers 12a–12b. The process information computer 74 may also include loading assistant software for transfering operating program revisions to the process control computers 12a–12b. The network also includes a control room data manager computer 76, which may be used to perform various file serving and tracking functions among the computers connected to the network.

An expert download assistant 78 is also provided to facilitate program revisions in the front end computers 18a–18b. In contrast, the loading assistant software in the process information computer 74 may be used to cause a new computer program to be downloaded to one of the process control computers 12a–12b through at least one of the front end computers 18a–18b and the mailbox section 26 of the dual-ported data memory 22. While the download assistant 78 may be resident in its own network computer, the download assistant could also reside in a suitable network computer, such as the process information system computer 74.

The loading assistant may also be used to cause the process control computer with the revised program to start operating in a mode which will enable real-time testing of the revised program. In this mode of operation, the process control computer will recieve input data and make output decisions, but these output decisions will not be transmitted to the field instrumentation devices. This will permit the plant engineer to evaluate the revisions, and even make further revisions if necessary before instructing the process control computer to assume an active mode of operation, such as the fox or dog modes.

Whenever it is decided that the manner in which the process control computers 12a–12b perform their particular manufacturing control operations should be changed through a program revision, the revised program for the process control computers 12a–12b must be compiled from the the source programming language to an executable file or set of dynamically linked files. In the preferred embodiment, a unique identifier is embedded into the executable code during the compile procedure. This identifier represents (or is otherwise associated with) the version of the revised software for the process control computers 12a–12b. The program version identifier is used to ensure proper alignment between the version of the program being executed by the process control computers 12a–12b and the files/tables in the front end computers 18a–18b used to evaluate write command messages to these process control computers.

As mentioned above, each of the front end computers 18a–18b include two permissive tables, such as the "PL" permissive table 80a for the Left process control computer 12a, and the "PR" permissive table 82a for the Right process control computer 12b. These permissive tables are used by the front end computers 18a–18b to determine whether any entity on the computer network 20 should be permitted to change the contents of specific locations in the dual-ported data memories 22a–22b. However, it should be appreciated that the data structure of the permissive table could be constructed to protect the contents of any memory location or area in the process control computers 12a–12b which could be altered from a write command message.

When a message is received by a front end computer 18 from an entity on the network which uses the write command protocol, such as a write command message from one of the operator workstations 70–72, a "data_write_check" sub-routine will be called by the central process unit of front end computer. The data_write_check routine will perform a comparison between the variable elements identified in the write command message and the variable elements in the permissive table for which changes should be authorized or denied. For example, if the front end computer 18a receives a write command message which seeks to increase/decrease an analog gain "AG" factor used by the program being executed by the Left process control computer 12a, the front end computer 18a will look up the element word for this particular AG factor in permissive table 80a and determine if a bit has been set to deny the authorization needed to change this factor. If authorization is denied, then the front end computer 18a will not transmit the write command message to the process control computer 12a. Instead, the front end computer 18a will preferably send a reply message to the host entity on the computer network 20 that originally sent the write command message, to inform the host entity that a write error has occured.

From the above, it should be appreciated that the PL and PR permissive tables stored in the front end computers 18a–18b need to be closely coordinated with the version of the program being executed by each of the process control computers 12a–12b. In order to ensure that each of these permissive tables are sufficiently matched with the programs being executed by their respective process control computers 12a–12b, the program version identifier discussed above is also embedded into these permissive tables when they are compiled. This program version identifier may then be sent to the process control computer 12 along with a verified write command message, so that the process control computer 12 will be able to confirm that the commanded variable change is appropriate to its program version.

To enhance the security of this verification process, the program version identifier from the permissive table is preferably altered by a suitable encryption algorithm before it is transmitted with the write command message to the mailbox section 26 of the stealth interface circuit 16 for the intended process control computer 12. The process control computer 12 receiving the write command message will then decode this version identifier, and compare it with the program version identifier embedded in its program to determine if their is a match. If the program version identifiers match, then the process control computer 12 will perform the commanded variable change. Otherwise, the process control computer 12 will respond by discarding the write command message and transmitting an appropriate error message to the front end computer 18.

The PL and PR permissive tables are also preferably provided with a data structure which permits write command authorization determinations to be made for specific host entities on the computer network 20. In other words, the permissive table 80a may permit particular variable changes to be made from operator workstation 70 that are not allowed to be made from operator workstation 72. Thus, the permissive tables may have several station specific table sections, as well as a default table section. Nevertheless, the ability may also be provided to bypass a check of the appropriate permissive table, through the use of a suitable password at a host entity on the computer network 20. However, in this event, a log should be created and stored in the front end computer 18 which will identify this transaction and the identity of the host entity (e.g., a CPU identifier).

It should be noted that the use of separate permissive tables for the process control computers 12a–12b has the advantage of enabling a program downloading operation to be performed on one of the process control computers while the other process control computer continues to actively control a manufacturing process. Indeed, even after a revised program has been successfully transferred to the process control computer 12a (and the corresponding permissive table 80a loaded in front end computer 18a), the use of separate permissive tables will enable the front end computer 18a to evaluate a write command message intended for the process control computers 12a which is distinct from a write command message intended for the process control computer 12b. While it may not be advisable in some circumstances to run the process control computers 12a–12b with different program versions in an active control mode, a passive operating mode may be used for the process control computer with the revised program while the other process control computer is in an active control mode. In such an event, the plant engineer may use the download assistant 78 during final program testing to issue write command messages for the passive process control computer, while another plant engineer issues write command messages to the active process control computer through the same front end computer 18.

The security server 68 is used to inform each of the computers residing on the network 20 who they may communicate with on the network. In this regard, the security server stores a specific security table for each of the valid entities on the network. Each of these security tables will identify which of the network computer entities a particular network computer may conduct bi-directional communications. For example, in the case of the front end computers 18a–18b, one of the first functions on start up will be to obtain their respective security tables from the security server 68. Accordingly, the security server 68 is shown in FIG. 1 to store a security table "S1" for the front end computer 18a, and a security table "S2" for the front end computer 18b. While the security server could also be used to send the PL and PR permissive tables discussed above to the front end computers 18, it is preferred that newly compiled permissive tables be received from the download assistant 78. In this regard, it should be noted that the download assistant is also preferably used to send the transfer map 37 intended for the IFS circuit 28 to the front end computer 18 along with the appropriate permissive table.

In order to assure the integrity of security table transfers from the security server 68 to the front end computers 18a–18b, a method of validating these transfers is utilized in the present embodiment. In accordance with this method, the front end computer 18 will embed a random or pseudo-random number in a broadcast network message to request that the security server 68 identify itself as a prelude to sending the appropriate security table. The security server will respond to this request with an acknowledgement message that utilizes a security protocol identifier which is different than that used with other types of network messages. Importantly, this acknowledgement message will include the random number from the front end computer 18 in a transformed state. In this regard, a suitable encryption algorithm may be used to alter the random number, and the random number should have a bit length which will make it difficult for any unauthorized entity to decode (e.g., 32 bits). Upon receipt of the acknowledgement message, the front end computer 18 will then either reverse the encryption process to obtain the random number or encrypt its original random number to make a comparison between the transmitted and received random numbers. Assuming that these random numbers match, then the front end computer 18 will determine that the acknowledgement message has been received from a valid security server, and the transfer process will proceed.

In order to further enhance the security of communications between the front end computers 18a–18b and other entities on the computer network 20, an additional validation procedure is preferably implemented. More specifically, this additional validation procedure is utilized to permit communication between the front end computers 18a–18b and any network entity for which a write command message may be recognized. In accordance with this validation method, the front end computer 18 will send a contract offer message on a periodic basis to the Ethernet address of each host entities on the network 20 which it recognizes as having a write message capability. Each of these contract offer messages will include a random or pseudo-random number or other suitably unpredicable message component. In order for a host entity to be able to have its write command messages recognized, it must respond to its contract offer message within a predetermined period of time (e.g., 10 seconds) with a contract acceptance message that includes a transformed version of this unpredicable message component. While any appropriate encryption algorithm may be used for this purpose, it is preferred that this encyrption algorithm be different than the encryption algorithm used to validate the transfer of a security table from the security server 68. Additionally, it should be noted that the security message protocol may be used for these contract offer and acceptable messages.

The front end computer 18 will then decrypt the random number embedded in the contract acceptance message to determine if a time limited communication contract will be established between the front end computer and this host entity at the specific Ethernet address for the host entity that was contained in the security table. This time limited communication contract will ensure that a write command message link between a front end computer 18 and a particular host entity will be reliable and specific. Thus, for example, the front end computer 18a will send a contract offer message to the Ethernet address of the operator workstation 72 which will contain a new random number (e.g., 32 bits in length). The operator workstation 72 will respond with a contract acceptance message that includes an encrypted version of this particular random number. Then, the front end computer 18a will either decrypt this number with the contract algorithm key stored in its memory for this purpose or use the same encryption algorithm to compare the offer and acceptance numbers. If these numbers match, then the front end computer 18a will process write command messages from the operator workstation 72 for a predetermined period of time. Otherwise, if the numbers do not match, then the front end computer 18a will disable a write command authorization bit for the Ethernet address of the operator workstation 72 from its security table S1 to indicate that write commmand messages from this operator workstation should be ignored.

The communication contract established for write command messages is time limited to enhance the transmission security of these particular messages. In the preferred embodiment, the communication contract will automatically expire within twenty seconds after being initiated. Nevertheless, in order to ensure that the ability to send write command messages is not interrupted, the contract offer messages should be sent from the front end computer 18 to each of the appropriate host entities on the network 20 on a periodic basis which will provide this continuity. For example, with a communication contract of twenty seconds, it is preferred that the contract offers be transmitted at a rate of approximately every ten seconds. In other words, every ten seconds, each of the host entities that are capable of transmitting recognizable write command messages will receive a new random number from each of the front end computers 18.

In the event that a host entity fails to respond to a contract offer message from a front end computer 18, the front end computer will preferably make three tries to establish or maintain a time limited communication contract. If no response is received from these three tries, then the the front end computer 18 will disable the write command authorization bit for the Ethernet address of this host entity from its security table. In such an event, the affected host entity will not be able to have its write command messages processed by the front end computer 18 until the security sewer 68 transmits a new security table to the front end computer 18.

It should be appreciated from the above that only the random numbers need to be encrypted to facilitate a transfer of the security table or to establish the time limited communication contract for write command messages. However, it should be understood that the security table itself or the write command messages could be encrypted as well in the appropriate application. Nevertheless, the use of different Ethernet protocols for security messages and write command messages, the use of different encryption algorithms for security table transfers and write command communication contracts, the limitation of the time of the write command communication contracts to short durations, and the use of specific permissive tables for each of the front end computers 18, all combine to provide a very high degree of communication and write command security for the process control computers 12a–12b. Additional protection is also substantially provided by the guardian circuit in the stealth interface circuit 16, the embedding of a program version identifier in the PL and PR permissive tables, and the encryption of the these program version identifiers by the front end computers 18a–18b when a verified write command message is transmitted to the process control computer 12a–12b. In this regard, it should be noted that the encryption algorithm used by the front end computers 18a–18b for the program version identifiers is preferably different than the encryption algorithm used for security table transfers or the encryption algorithm used to establish the time limited communication contracts for write command messages.

Figure 4A:
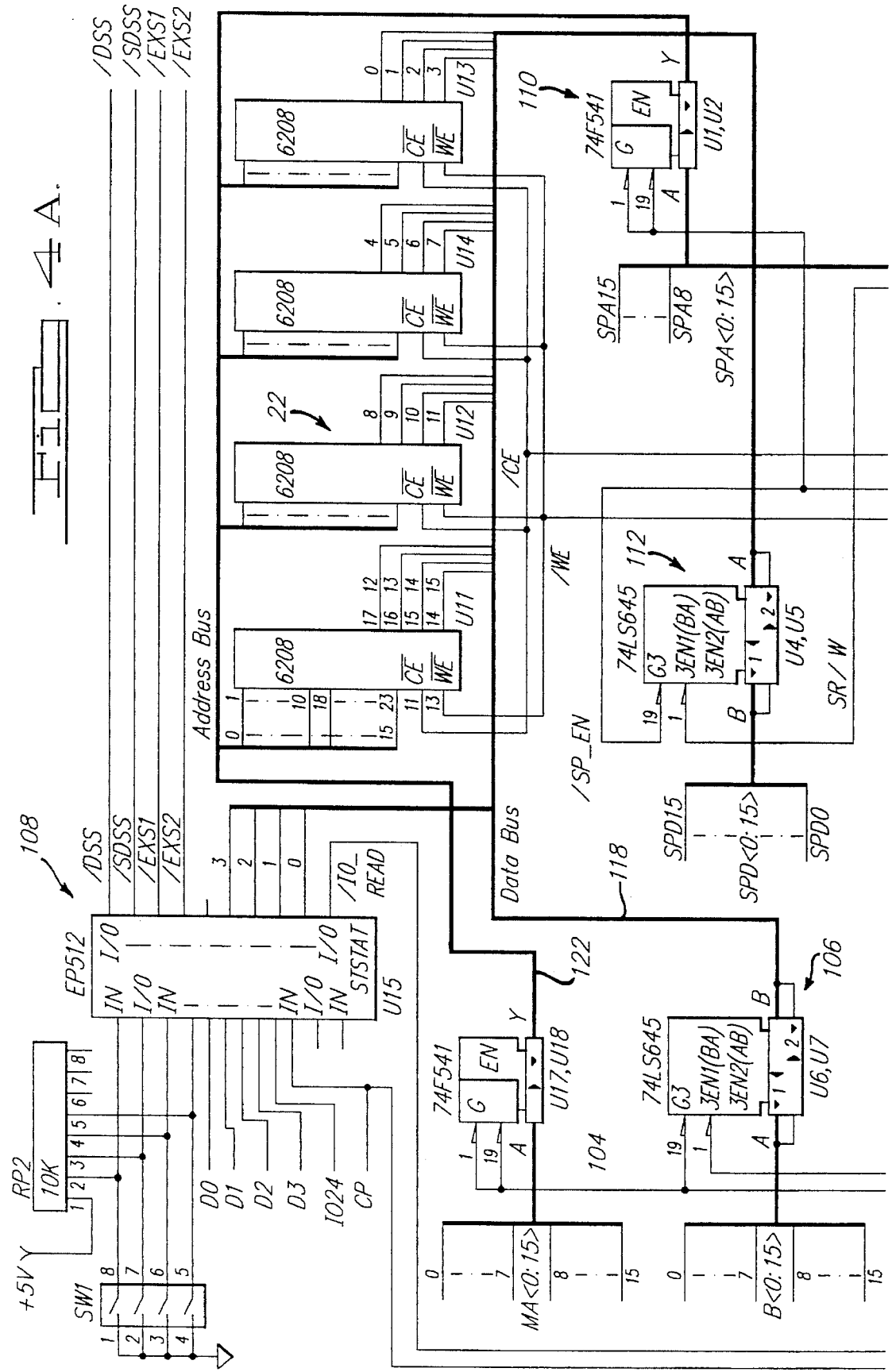
FIGS. 4A and 4B comprise a schematic diagram of the stealth interface of FIGS. 1 and 2.
Figure 4B:
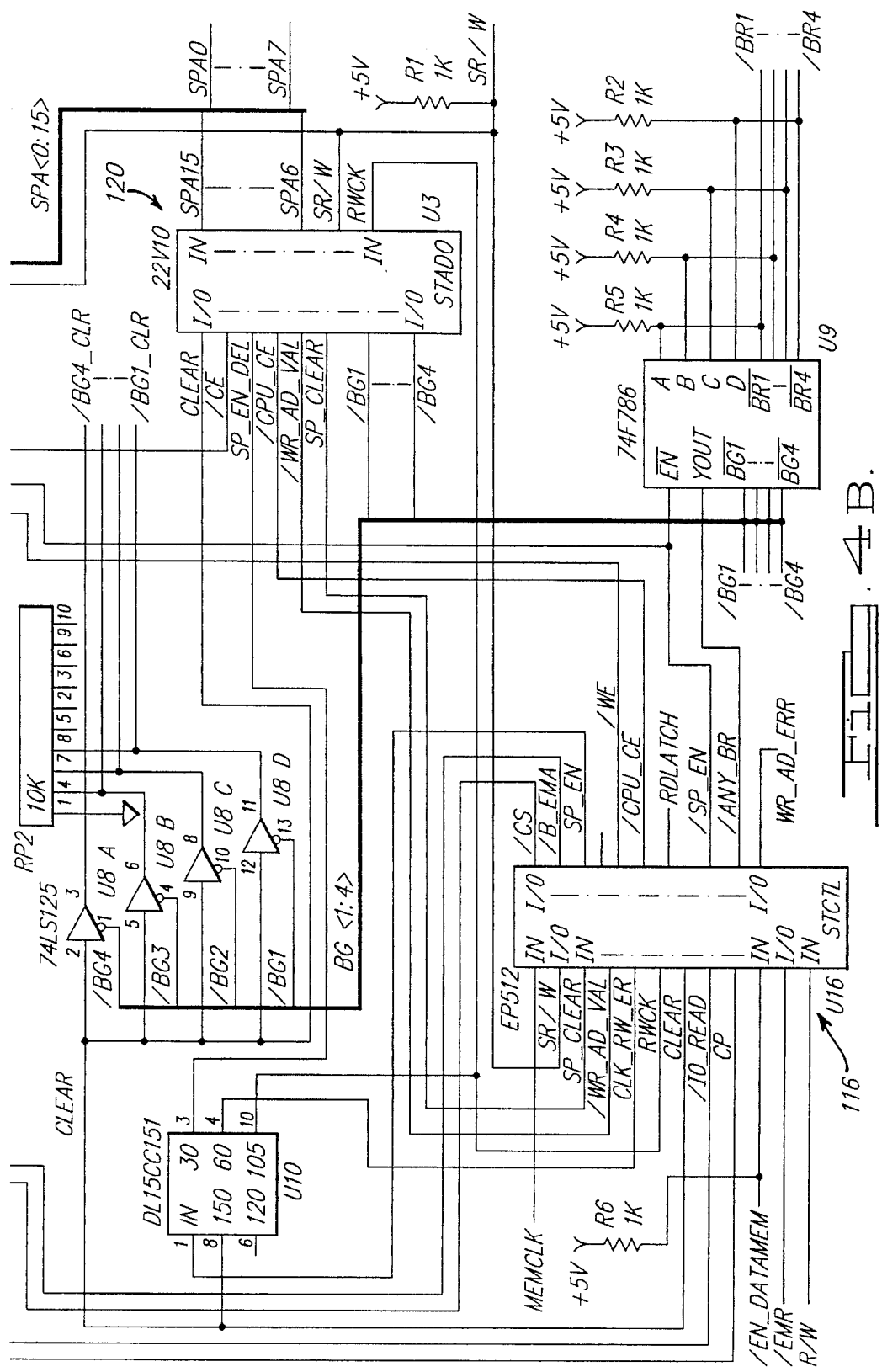

Turning to FIG. 3, a block diagram of the stealth interface circuit 16 is shown. Reference will also be made to the schematic diagram of the stealth interface circuit 16, which is shown in FIGS. 4A–4B. The stealth interface circuit 16 is interposed between the internal bus structure 100 of the process control computer 12 and the externally directed stealth port 102. The stealth interface circuit 16 is connected to bus structure 100 via a set of suitable buffers. In this regard, buffer block 104 includes two 8-bit buffer circuits U17–U18, which receive address information from the address bus on the process control computer 12. Similarly, buffer block 106 includes two 8-bit buffer circuits U6–U7, which receive data information from the data bus of the process control computer 12.

The stealth interface circuit 16 also includes a data control block 108, which is also connected to the bus structure 100 of the process control computer 12. As indicated in FIG. 4A, the data control block 108 is preferably comprised of a Programmable Array Logic "PAL" circuit U15 (e.g., EP512), which is used to detect the SDSS and DSS signals from the process control computer 12. As well known in the art, a PAL circuit has fusable links which may be programmed so that a plurality of internal AND gates and OR gates will be configured to perform a desired logic function. While a PAL circuit provides a relatively low cost way of implimenting logic functions, it should be understood that other suitable circuit devices may be used for this application. It should also be noted that the PAL circuit is programmed to detect two extra strobe signals that may be generated by the process control computer 12, namely the "EXS1" and "EXS2" signals. One or both of these extra strobe signals may be used by the process control computer 12 to indicate that certain data stored in the dual-ported data memory 22 is stable, such as data used to display graphical information.

Figure 5A:
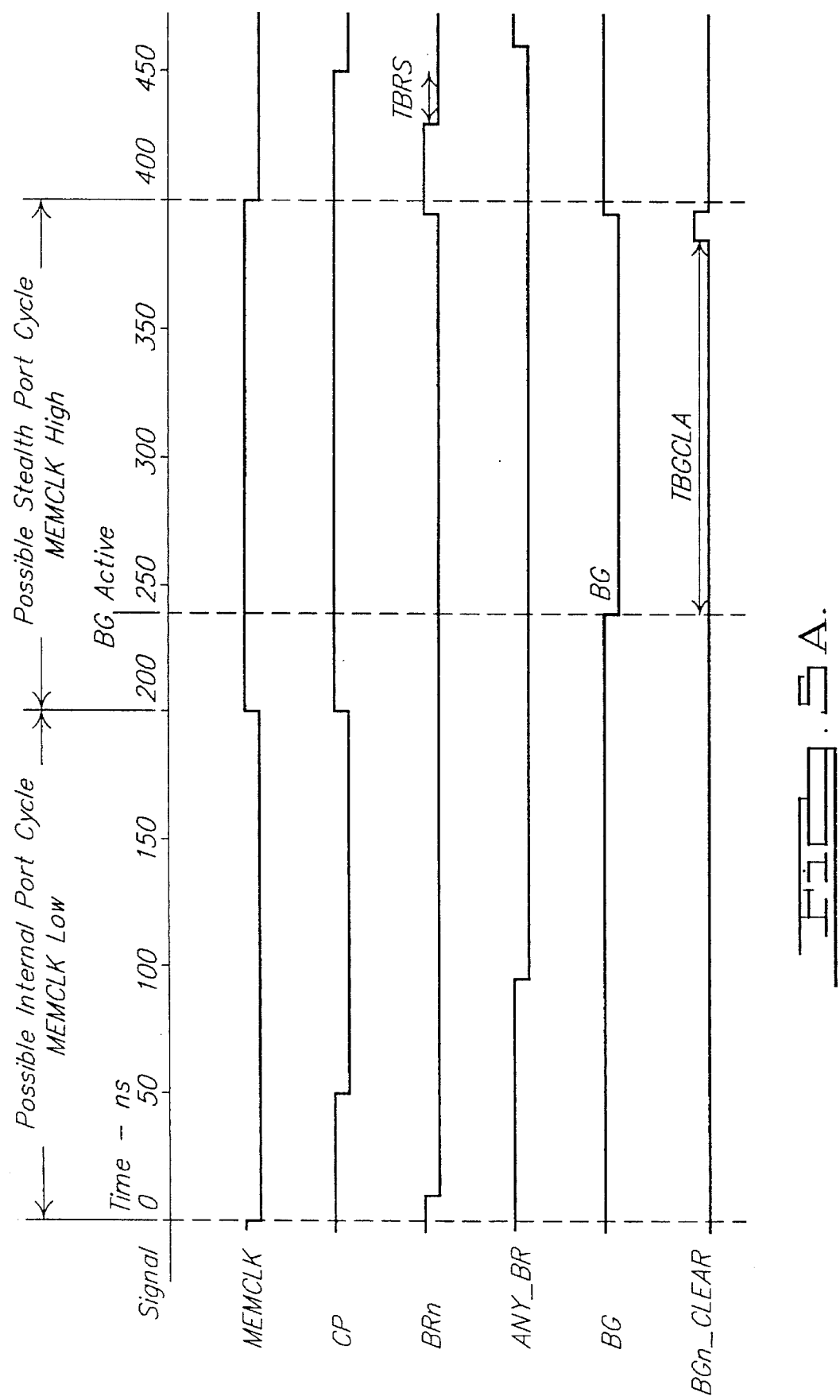
FIGS. 5A and 5B illustrate two timing diagrams for the stealth interface.

The stealth interface circuit 16 also receives four control signals from the process control computer 12 which are used to access the dual-ported data memory 22. These signals are "/EN_DATAMEM", "/EMR", "R/W" and "MEMCLK". The first three of these signals relate to whether the process control computer 12 seeks to read or write to the dual-ported data memory 22. However, MEMCLK is the memory clock signal referred to above which effectively divides the time in the machine cycle of the process control 12 available for accessing the dual-ported data memory 22. The MEMCLK signal is a fifty percent duty clock signal, as shown in the timing diagram of FIG. 5A. In accordance with the method illustrated in this timing diagram, the dual-ported data memory 22 may be accessed from the internal process control computer port 100 when MEMCLK is Low. Then, when MEMCLK undergoes a transition to a High state, the dual-ported data memory 22 may be accessed from the external stealth port 102. While the MEMCLK signal is shown to have a period of 400 nano-seconds (i.e., a frequency 2.5 MHz), it should be understood that other suitable periods and duty cycles may be provided in the appropriate application.

On the stealth port side of the stealth interface circuit 16, a set of suitable buffers are also provided to handle the transfer of address and data information. In this regard, buffer block 110 includes two 8-bit buffer circuits U1–U2, which receive address information from the external stealth port 102. Similarly, buffer block 112 includes two 8-bit buffer circuits U4–U5, which are capable of transmitting and receiving data information between the dual-ported data memory 22 and the stealth port 102.

Figure 5B:
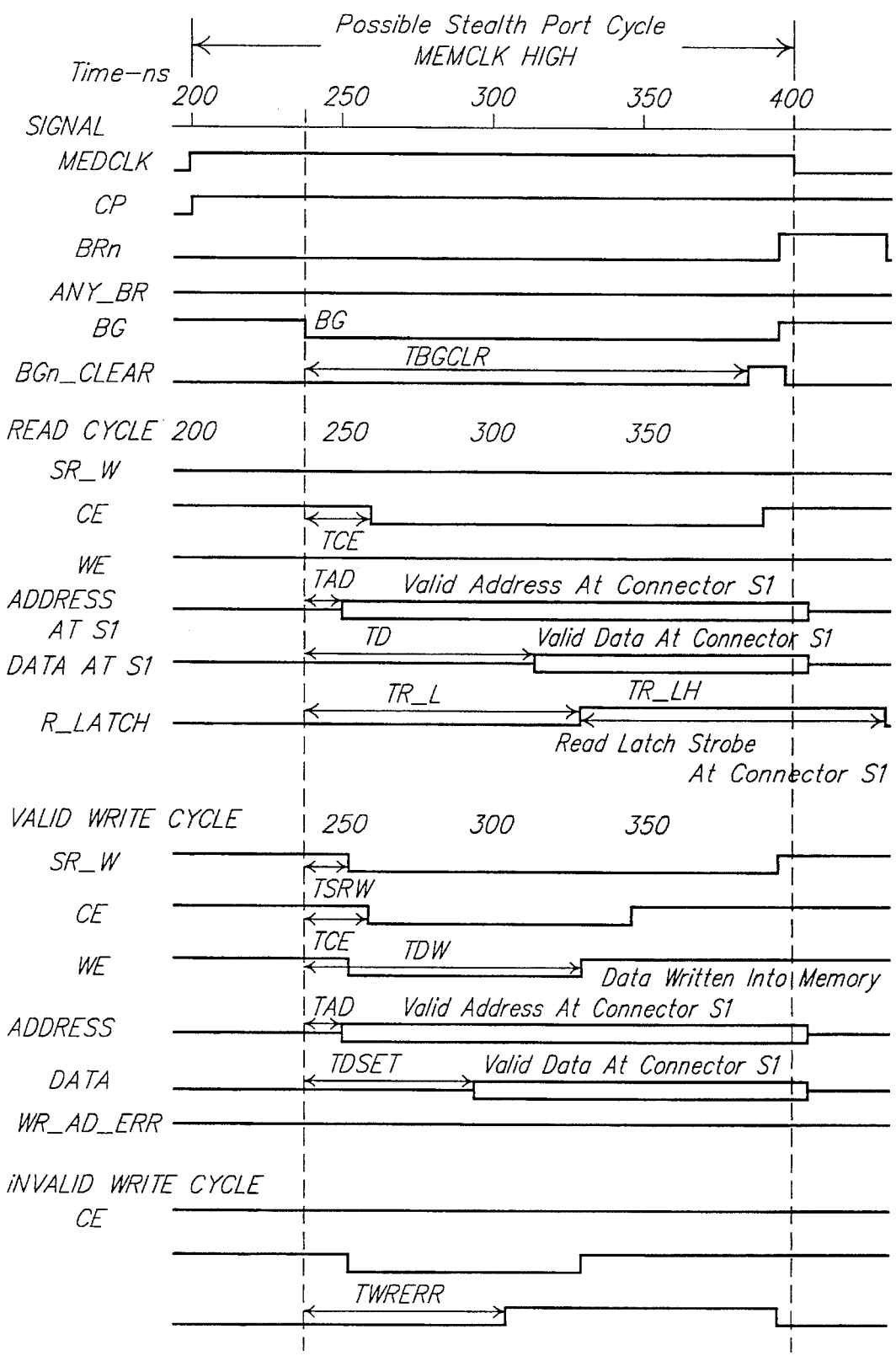
Figure 5A:
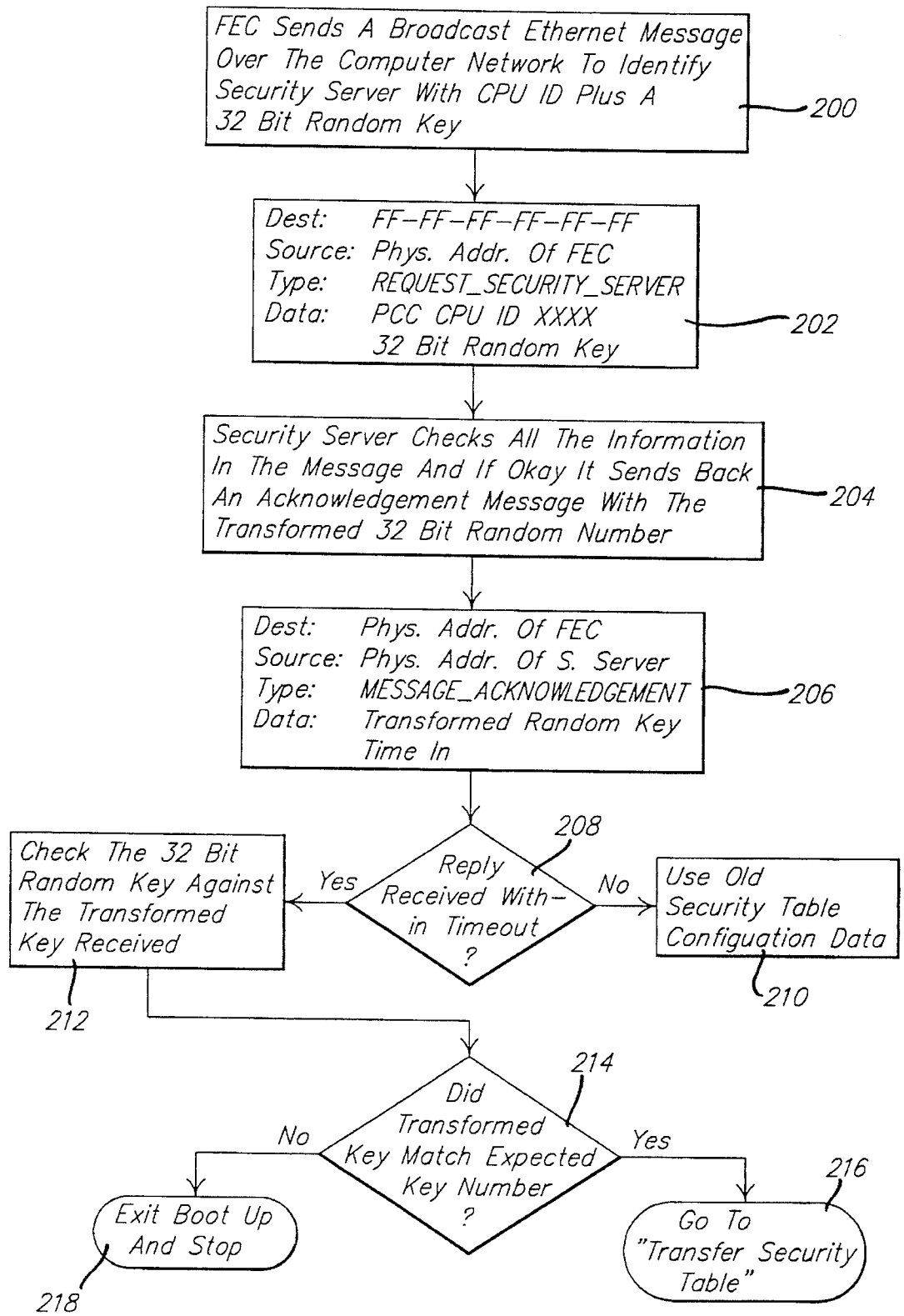

Additionally, the stealth interface circuit 16 includes a arbitration circuit 114 which receives bus request signals from external entities on the stealth port 102. As shown in FIG. 5B, the present embodiment provides four individual channel lines for the incoming bus request signals "/BR1../BR4". Thus, the stealth interface circuit 16 enables up to four different external entities to be connected to the stealth port 102. The arbitration circuit 114 is shown in FIG. 4B to comprise a four input asynchronous bus arbiter circuit U9 which will grant bus access to the first bus request signal received. In this regard, a specific bus grant signal "/BG1../BG4" will ultimately be generated to inform the particular external entity who won the bus that the channel is clear for its use. The arbitration circuit 114 also has an internal AND gate which will produce the any-bus-request signal "/ANY_BR" shown in the timing diagram of FIG. 5A.

The stealth interface circuit 16 further includes a stealth port control circuit 116, which is used to control access to the dual-ported data memory 22. The control circuit 116 is shown in FIGS. 4A–4B to comprise a PAL circuit U16, a timer circuit U10 and a set of tri-state buffers which are contained in chip U8. In the case of memory access for the internal process control computer bus 100, the PAL circuit U16 will transmit the chip select signal "/CS" to the buffers 104 and 106 to latch or capture address and data information from the internal bus. The PAL circuit U16 will also send the enable memory read signal "/B_EMR" to the buffer 106 when the process control computer 12 needs to latch or capture data from the data bus 118 of the stealth interface circuit 16. In this regard, the PAL circuit U16 is responsive to both the MEMCLK signal and the central process unit clock signal "CP" of the process control computer 12.

In the case of memory access from the external stealth port 102, the PAL circuit U16 will transmit the enable signal "/SP_EN" to the buffers 110 and 112 to latch or capture address and data information from the external bus. The PAL circuit U16 will also send the enable memory read signal "SR/W" to the buffer 112 when an external entity is permitted to latch or capture data from the data bus 118 of the stealth interface circuit 16. The SR/W signal is received at the stealth port bus 102, and it provides an indication from the external entity the direction of data flow desired. In this particular embodiment, the SR/W signal is active High for a read cycle and active Low for a write cycle. The SR/W signal is common to all four potential external users, and it should be held in a tri-state until the external user winning the bus receives its active Low/BR signal.

The PAL U16 also transmits the SR/W signal to the check point guardian circuit 120 (PAL circuit U13) to initiate an evaluation to be made on the address of the dual-ported data memory 22 selected by the external entity for a write operation. In this regard, the guardian circuit 120 is programmed to inhibit the transition needed in the chip enable signal "/CE" for accessing the dual-ported data memory chips U11–U14, whenever the address is outside of the mailbox section 26.

With respect to the sequence of operation for the stealth interface circuit 16, it should be appreciated that a memory read/write cycle from the stealth port 102 must be initiated by the external entity seeking to access the dual-ported data memory 22. This cycle is begun with the transmission of a bus request signal /BR from the external entity, such as front end computer 18a. Upon the receipt of any bus request signals, the arbitrator circuit 114 will transmit an active Low any-bus-request signal /ANY_BR to the PAL circuit U16. The any-bus-request signal is directed to an internal flip-flop of the PAL circuit U16, which operates under the clock signal CP. Accordingly, the any-bus-request signal needs to be present before the falling edge of the clock signal CP in order for stealth port access to occur when MEMCLK goes high, as shown in the timing diagram of FIG. 5A. If the latched any-bus-request signal is active, the stealth interface circuit 16 will begin a stealth port memory cycle. Otherwise, the stealth interface circuit 16 will not initiate a stealth port memory cycle until the next MEMCLK signal period.

When a stealth port memory cycle occurs, the /SP_EN signal is generated from the PAL circuit U16. As indicated above, this signal will enable the address and data buffers on the stealth port. The /SP_EN signal will also enable the arbitration circuit 114, which issues a specific bus grant signal /BG for the external user which wins the bus. Once the external entity detects its bus grant signal, then it may transmit either the memory address it seeks to read or the address and data necessary for a write operation. The chip enable signal /CE is delayed by the PAL circuit U13 to allow for the delay introduced from the address buffer 110, as the address needs to be stable before the RAM chips U11–U14 are actually accessed.

For a stealth port read cycle, the data placed on the data bus 118 will become stable approximately 45 ns after /CE becomes active. In this regard, it should be noted that symbols such as "TCE" in the timing diagram of FIG. 5B, indicate the appropriate delay time duration. A read latch signal RDLATCH directed to the PAL circuit U16 may then be used by the external entity to either latch the data into the buffer 112 or indicate that data is available. For a stealth port write cycle, the address lines on the address bus 122 will be monitored by the guardian circuit 120 to ultimately permit or deny write access to the stealth port 102. When write access is denied, the guardian circuit will not generate the active Low chip enable signal /CE, and thereby restrict an external entity on the stealth port 102 from writing to the particular address location in the dual-ported data memory 22 that it has selected. In this event, the guardian circuit 120 will also generate a write address valid signal "WR_AD_VAL", which is transmitted to the PAL circuit U16 of the control circuit 116. The PAL circuit U16 will respond by generating a write address error signal "WR_AD_ERR" for transmission to the external entity. The write address error signal is active High and valid only during the current memory access cycle, and this signal is common to all external entities.

For stealth port accesses to valid write addresses, the guardian circuit 120 will activate the /CE signal. Additionally, the SR/W signal from the external entity should become active when the bus grant signal /BG is Low. The PAL U16 will also cause the write enable signal /WE for the RAM chips U11–U14 of the dual-ported data memory 22 to become active, and the rising edge of the /WE signal is used to write data into these RAM chips.

The control circuit 116 also includes a timer circuit U10, which will generate a CLEAR signal approximately 150 ns after one of the bus grant signals /BG becomes active. The CLEAR signal is used to cause the tri-state buffers in buffer chip U8 to generate individual bus grant clear signals "BG1_CLR..BG4_CLR" to each external user. The CLEAR signal is also used to clear the stealth port memory cycle by deactivating the stealth port enable signal /SP_EN.

Figure 6B:
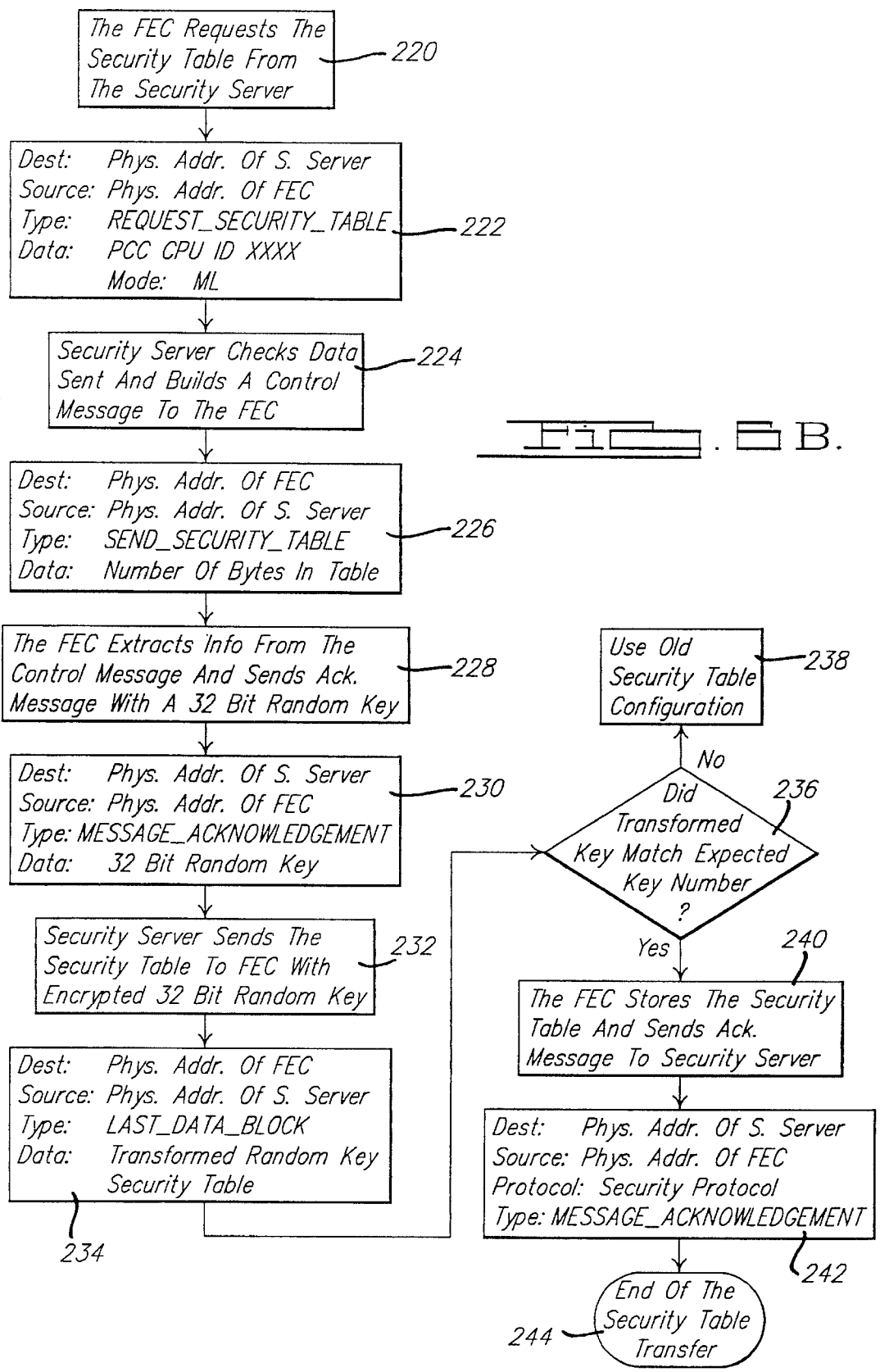
FIGS. 6A–6E comprises a set of flow charts illustrating particular aspects of the security and validation methods according to the present invention.

Refering to FIGS. 6A–6E, a set of flow charts is shown to further illustrate various aspects of the security and validation methods discussed above. In this regard, FIG. 6A shows the part of the boot up procedure of the front end computer 18 which is directed to a search for the security server 68. Then, once the security server has properly identified itself to the front end computer 18, FIG. 6B shows the procedure for transfering the security table (e.g., security table S1). Thereafter, FIG. 6C shows the procedure for establishing a time limited communication contract with each of the operator stations identified in the security table as having write command ability. Finally, FIGS. 6D–6E combine to illustrate the procedure for validating a write command message sent from an operator station (e.g., operator station 72).

Turning first to FIG. 6A, block 200 indicates that the front end computer "FEC" sends a broadcast message over the computer network 20 to request that the security server 68 identify itself to this front end computer. This message preferably utilizes the Ethernet protocol for security messages. The content of this broadcast network message is generally shown in block 202. In this regard, the network message includes a destination address "FF-FF-FF-FF-FF-FF" which will cause the message to be sent to every entity that is operatively coupled to the PAN-1 and PAN-2 segments of the computer network 20. The network message also includes the source address of the front end computer. The network message also includes a type indication, namely "REQUEST_SECURITY_SERVER". In the data portion of the network message, the CPU identification is given for the process control computer 12 to which the front end computer 18 is connected. Additionally, and importantly, the data portion of the network message also includes an unpredicable key, such as a 32 bit random number. As discussed above, this random key is used to verify the identity of the security server 68.

Block 204 shows that the security server 68 will check all of the information in the broadcast network message, such as the physical Ethernet address of the front end computer and the CPU ID of its process control computer 12. Assuming that this information corresponds to the information stored in the security server for this front end computer, an acknowledgement message 206 will be sent back to the physical Ethernet address of the front end computer. In order to enable the front end computer to verify the identity of the security server 68, the acknowledgement message 206 includes a transformation of the random key sent from the front end computer 18. As indicated above, this transformation is performed with an encryption algorithm which is unique to messages from the security server 68.

Diamond 208 shows that the front end computer 18 will wait a predetermined amount of time to receive the acknowledgement message. If the acknowledgement message is not received within this timeout period, then the front end computer will use the last security table stored in its memory or the default security table if this is the first time the front end computer 18 is being brought into operation (block 210). However, if the acknowledgement message 206 is received in time, then the front end computer 18 will check its random key against the transformed version of the key which was contained in the acknowledgement message (block 212). As indicated above, this comparison may be accomplished by either performing a transformation on the random key ring the encryption algorithm for security messages or ring a corresponding decyption algorithm. If the transformed key matches the expected key number (diamond 214), then the front end computer 18 will proceed to the procedure shown in FIG. 6B for transfering a copy of the current security table from the security server 68 (block 216). Otherwise, the front end computer will exit this portion of the boot up procedure and stop accumulating further network communication capability (block 218). In one form of the present invention, the front end computer 18 may be permitted to conduct network communications at this point, but not process any write command messages received from an entity on the computer network 20, until such time as a security table is successfully transferred to the front end computer.

Turning now to FIG. 6B, block 220 shows that the front end computer 18 starts the procedure for transferring a copy of the security table by sending a request message to the specific (logical or physical) Ethernet address of the security server 68. This physical Ethernet address is the address learned and stored through the boot up procedure discussed above in connection with FIG. 6A. Block 222 indicates that this request message includes an identification of the CPU ID for the process control computer being serviced by the front end computer 18. Additionally, the front end computer 18 will also inform the security server 68 as to whether this CPU ID is for the Left process control computer 12a or the Right process control computer 12b through the Mode data (e.g., ML for the Left process control computer).

Once the security server receives this request message, it will check the data contained in the message, and build a control message for the front end computer 18 (block 224). As shown in block 226, this control message will inform the front end computer 18 how many bytes are contained in the security table for the process control computer identified in the request message. The front end computer 18 will respond with an acknowledgement message that will contain a new random key (blocks 228-230). The security server will then transmit the security table (e.g., security table S1 for the Left process control computer 12a) with the transformed random key (blocks 232-234). The front end computer 18 will then determine if the transformed key matches the expected key (diamond 236). If the keys do not match, then the front end computer 18 will use the old or existing security table stored in its memory (block 238). Otherwise, the front end computer 18 will store the new security table for use, and send an acknowledgement message back to the security server (blocks 240-244). While the front end computer 18 could also be provided with the editing capability to create its own security table, it is preferred that a separate network security server be employed in order that the front end computer be dedicated to the functions identified above.

Refering to FIG. 6C, the procedure for establishing a time limited communication contract is shown. The front end computer 18 begins by creating a new watchdog key, which is represented by a 32 bit random number (block 246). The front end computer 18 will then send a watch-dog message in turn to the physical Ethernet address of each of the operator stations (identified in the security table as having write command message capability). In this regard, it should be appreciated that these are individual watch-dog messages which include a new watch-dog key for each message (block 248). Each operator station which receives such a watch-dog message will respond with a watch-dog reply message that includes a transformation of the watch-dog key (blocks 250-252).

Since it is possible that an operator station may not currently be in communication with the computer network 20, the front end computer 18 will preferably wait for a suitable timeout period for a reply, such as ten seconds (diamond 254). If the operator station does not reply to the watch-dog request message 248 within this timeout period, the front end computer 18 will make additional attempts to make contact (diamond 256 and block 258). If a reply is not received from this operator station after all of these attempts, then the front end computer 18 will disable the write command ability of this particular operator station (block 260). However, it should be appreciated that this write command ability may subsequently be re-established, such as when an updated security table is transferred to the front end computer 18. In this regard, it should be noted that the security server 68 may initiate the security table transfer procedure discussed above through a suitable network message to the front end computer 18.

In the event that the operator station does reply to the watch-dog request message, then the front end computer 18 will determine whether the transformed watch-dog key contained in the reply message matches the expected key number (diamond 262). If a match is not found through this comparison (as discussed above), then the front end computer 18 will ignore the reply message (264). At this point, the front end computer 18 could again attempt to establish a time limited communication contract with this operator station or disable its write command abilities. In the event that a match was found, then the front end computer 18 will copy the previous, valid watch-dog key of this operator station from the current key position to the old key position (block 266). Then, the front end computer 18 will save the transformed watch-dog key received in the reply message in the current key position. As will be discussed below, the current and old keys are used to evaluate the validity of write command messages from the operator station during the period in which a time limited communication contract is in force. In this regard, it should be understood that the procedure shown in FIG. 6C is repeated for each of the operator stations with write command privileges before the time limited communication contract expires in order to maintain a continuous ability of the operator stations to have their write command messages processed by the front end computer 18.

Refering to FIGS. 6D–6E, these figures combine to illustrate the procedure for validating a write command message sent from an operator station (e.g., operator station 72) to the front end computer 18. This procedure begins with an operator station sending a write command message to the front end computer 18 (block 268). This message preferably utilizes the standard Ethernet protocol for communication between the front end computer 18 and other entities on the computer network 20. In this regard, the write command message will include not only the variable(s) sought to changed, but also the watch-dog key from the time limited communication contract, the CPU identification of the recipient process control computer, and the program version identification of this process control computer 12. The front end computer 18 will then perform several checks on this write command message. For example, the front end computer 18 will examine the security table to determine If it has an entry for this particular operator station (diamond 270). If this operator station was not found in the security table, then the front end computer will return the write command message to the operator station and create a stored log of this error (block 272).

Assuming that the operator station was identified in the security table, then the front end computer will check the security table to determine if the write command bit was set for this operator station (diamond 274). At this point, it should be understood that the security table contains not only the Ethernet address of every valid entity on the computer network 20 who can communicate with the front end computer, but also an indication of whether these entities have write command privileges. The security table may contain additional information pertaining to each of these entities, such as a CPU identification and whether or not these entities may request specific types of information from the process control computer, such as alarm messages. If the security table does not have the bit set to indicate write command privileges, then the front end computer will return the write command message to the operator station (or other source entity), and log this error (block 276).

In the event that the operator station does have write command privileges, then the front end computer will determine whether or not the watch-dog key (contained in the write command message) matches either the current or old watch-dog keys (diamond 278). If a match is not found, then the front end computer will return an invalid watch-dog message to the operator station (block 280). If a match was found, then the front end computer will preferably check to see if the program version identification contained in the write command message matches the program version identification stored in the front end computer for the recipient process control computer 12 (diamond 282). If these program version identifications do not match, then the front end computer will return an invalid program version message to the operator station (block 284).

The front end computer 18 will also check to see if the write command message contains an indication that the permissive table for the recipient process control computer should be bypassed (diamond 286). The ability to bypass the permissive table may be considered a special privilege which should require the use of a password or physical key which is assigned to the operator with this privilege. If the bypass bit was set in the write command message, then the front end computer will still preferably check the permissive table (e.g., permissive table 80a) to determine If a bypass is permitted for the specific permissive table or table section that would otherwise be addressed (diamond 288). If a bypass of this permissive table is not permitted, then the front end computer will return a message to the operator station to indicate that no write access is available in this way (block 290). If a bypass of the permissive table is permitted, then the front end computer will transmit the write command message to the recipient process control computer with a transformed version of the program version identification stored in the permissive table of the front end computer (block 292). The recipient process control computer 12 may then determine whether this transformed program version identification matches the program version identification of its operating program before deciding to change the variable(s) listed in the write command message.

In the event that the write command message does not have the bypass bit set, then the front end computer 18 will examine the permissive table to determine if the the variable(s) to be changed have their write command bit set (diamond 294). If the write command bit is not set for any one of these variables, then the front end computer will return a no write access message to the operator station (block 296). Otherwise, if the front end computer determines that the write command message is acceptable, then it will transmit the message to the recipient process control computer as discussed above (block 292).

Refering to FIG. 7, a block diagram of the application software 300 for the front end computer 18 is shown. In this regard, FIG. 7 shows the interaction of the application software with the Q-bus 302 of the front end computer 18 and with the Ethernet services 304 for the computer network 20. Thus, for example, a bi-directional line is provided between the Q-bus 302 and the IFQ driver 308. The IFQ driver 308 represents the device driver software for controlling the communication with the CPU of the front end computer 18. The IFQ driver 308 is coupled to the "MI Sync" subsystem 310 through a datastore event 312. In this regard, the MI Sync subsystem receives notification of DMA completions from the IFQ driver 308, such as when the SDSS data from one of the process control computers 12a–12b has been completely received in the appropriate Interim buffer (e.g., Interim buffer 46a or 48b). The reflective memories 46a–56a from FIG. 1 are shown in FIG. 7 as reflective memories 3 14. FIG. 7 also illustrates that the reflective memories 314 are operatively coupled to the Q-bus 302 of the front end computer 18.

The MI Sync subsystem 310 represents that portion of the application software 300 which is responsible for synchronizing the incoming SDSS and DSS data frames from each of the process control computers 12a–12b through the operation of the reflective memories 314, as discussed above. The MI Sync subsystem also notifies the "MI MOD Health" module 316 and "System Messages" module 318 when a data frame is available for processing. Additionally, the MI Sync subsystem 310 is also used to detect whether or not reflective memory updates are not occuring, such as when one of the process control computers has stopped sending data to the front end computer 18. This procedure is implemented through the "MOD Status" module 320 and the "MI Watchdog" module 322. The MI Watchdog module 322 uses a two-second timer to detect if the front end computer 18 has stopped receiving data from either of the process control computers 12a–12b.

The MI MOD Health module 316 processes health bit changes in the data being received by the front end computer 18 from the process control computers 12a–12b. In this regard, the MI MOD Health module 316 sends these changes to the "EVT Event Handler" module 324. Similarly, the MI System Messages module 318 processes incoming system messages from the process control computers, and it queues any requests to the EVT Event Handler module 324. The EVT Event Handler module 324 processes event buffers, formats text for output to the Print Services module 326, and records errors and other events in an event log.

The reflective memories 314 are coupled to the "MI CISS Memory Read" module 328, which performs read operations on the reflective memories. In this regard, the MI CISS Memory Read module 328 formats query responses into the standard Ethernet protocol for transfering data/messages, and directs the response to the requesting network entity via port 330. The "NI CISS" module 332 receives incoming query requests from a network entity using the standard protocol for transfering data/messages. The NI CISS module 332 performs an initial security check on the message, and routes the request to the appropriate process as determined by the message type. For example, the NI CISS module 332 will route a read data message to the MI CISS Memory Read module 328. Additionally, the NI CISS module 332 will route program download requests to the "MI Download Handler" module 334. Other request messages will be routed to the "MI Message Services" module 336.

The application software 300 also includes modules which facilitate communication with a User Interface. In this regard, the User Interface is used to provide a window into the operation of the front end computer 18, as opposed to an interface to one of the process control computers 12a–12b. The User Interface software may be accessed "locally" through a terminal connected directly to the front end computer 18. The User Interface software may also be accessed "remotely" through an application that could be run from the security server 68. The User Interface is used to disable or re-enable network communications for a specific protocol, perform diagnostic functions, re-boot the front end computer 18, monitor reflective memory updates, monitor network activity, and otherwise manage access to privileged front end computer functions.

The application software modules that handle User Interface requests are the "NI Remote User" module 338, the "UI Local" module 340 and the "UI Services" module 342. The NI Remote User module 338 receives all messages having the protocol for User Interface communications, and it forwards valid requests to the UI Services module 342. The UI Services module 342 provides a data server for both local and remote user requests. The UI Local module 340 handles the local User Interface display screens in order to display responses on the local terminal.

The application software 300 also includes an "NI Transmit Done" module 344, which receives notification of Ethernet-write completions and maintains a free queue of network interface transmit message buffers. Additionally, an "EVT File Maint" module 346 is used to delete aged event log ties. Furthermore, an "NI Watchdog" module 348 and an "NI SCSP" module 350 to implement the watchdog security process discussed above. In this regard, the NI Watchdog module 348 sends watchdog request messages to the operator stations, and the NI SCSP module 350 processes the reply messages (as well as all other network messages using the security protocol). The NI Watchdog module 348 also checks to see if reply messages were received to each of the watchdog request messages.

Other than watchdog reply messages, the NI SCSP module 350 forwards all other security protocol messages to the "CFG Config Manager" module 352. The CFG Config Manager module 352 processes the security requests and performs the initial loading of the permissive tables 80a–82a. The CFG Config Manager module 352 also performs the loading of a memory map to be discussed below in connection with FIG. 8. The application software 300 also includes a "MIF Master Process" module 354, which performs the basic initialization routines to create all of the other front end computer processes. The MIF Master Process module 354 is also used to detect an unexpected termination of any of these processes.

Figure 8C:
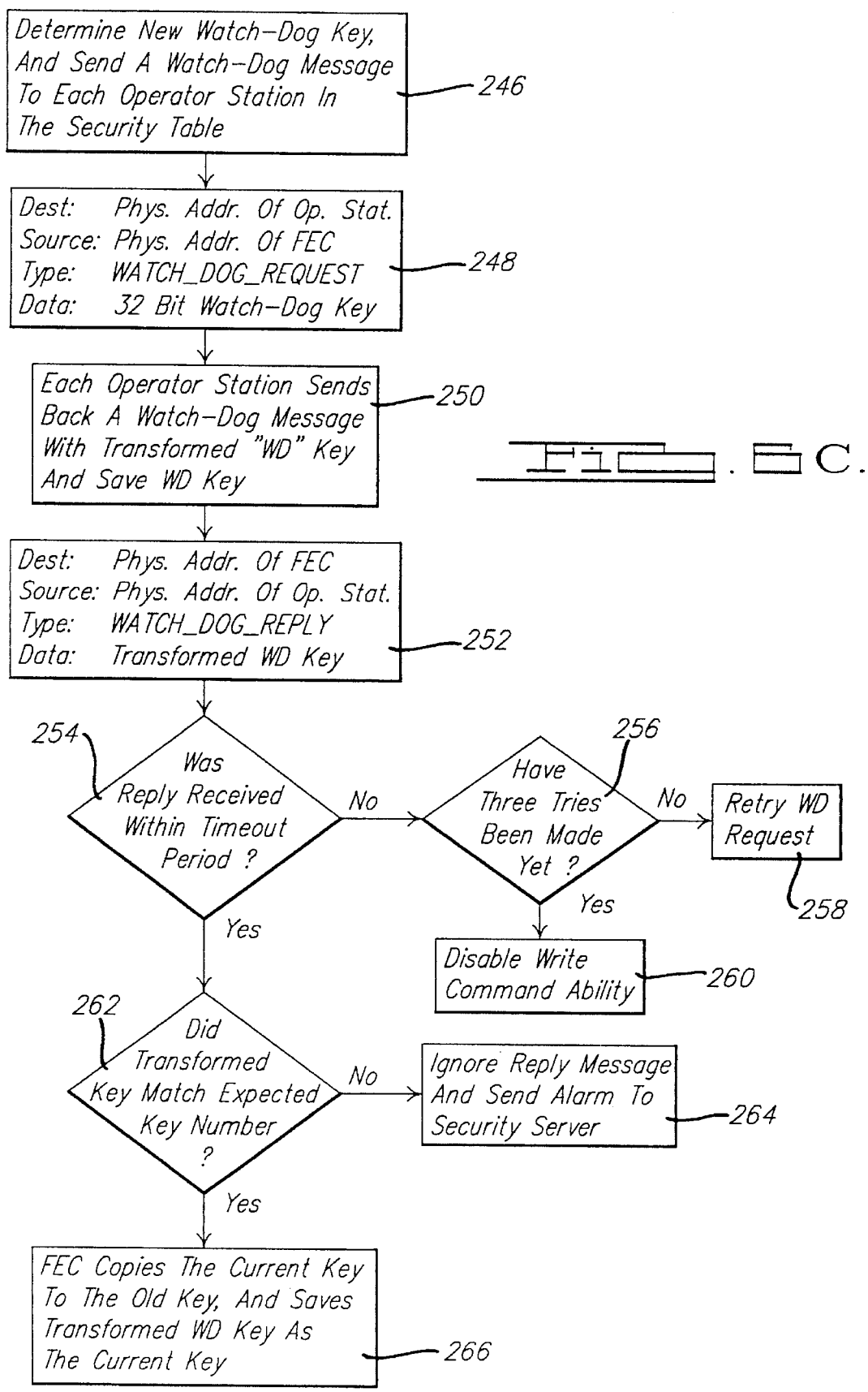
FIG. 8 is a diagrammatic illustration of the configuration for the front end computers.
Figure 8D:
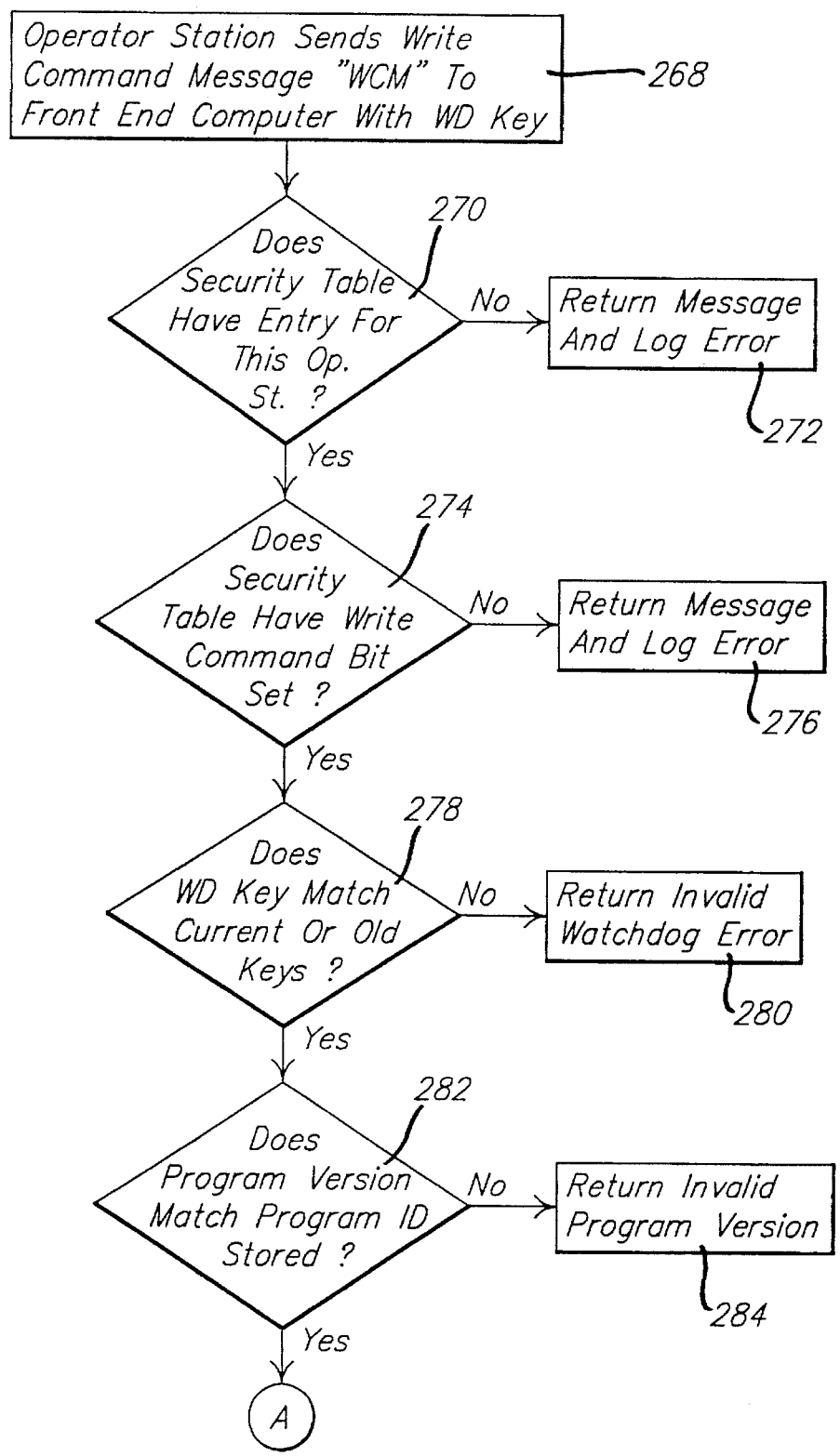
Figure 5E:
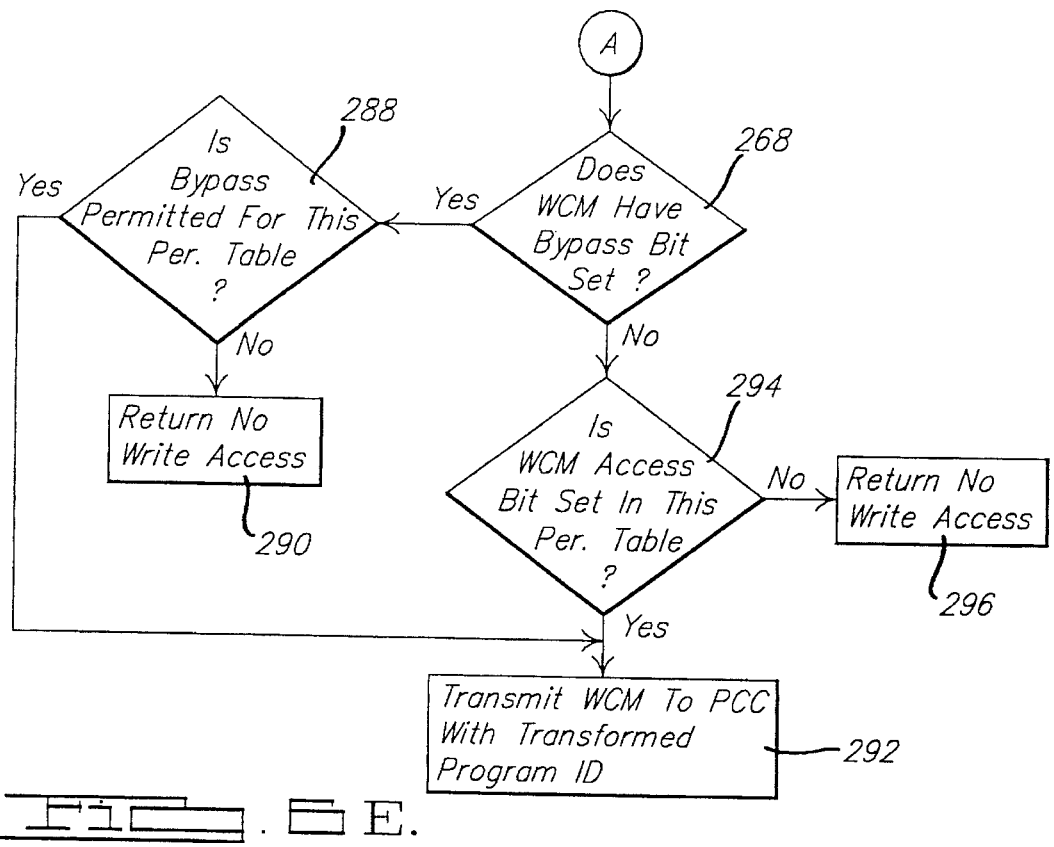
Figure 6:
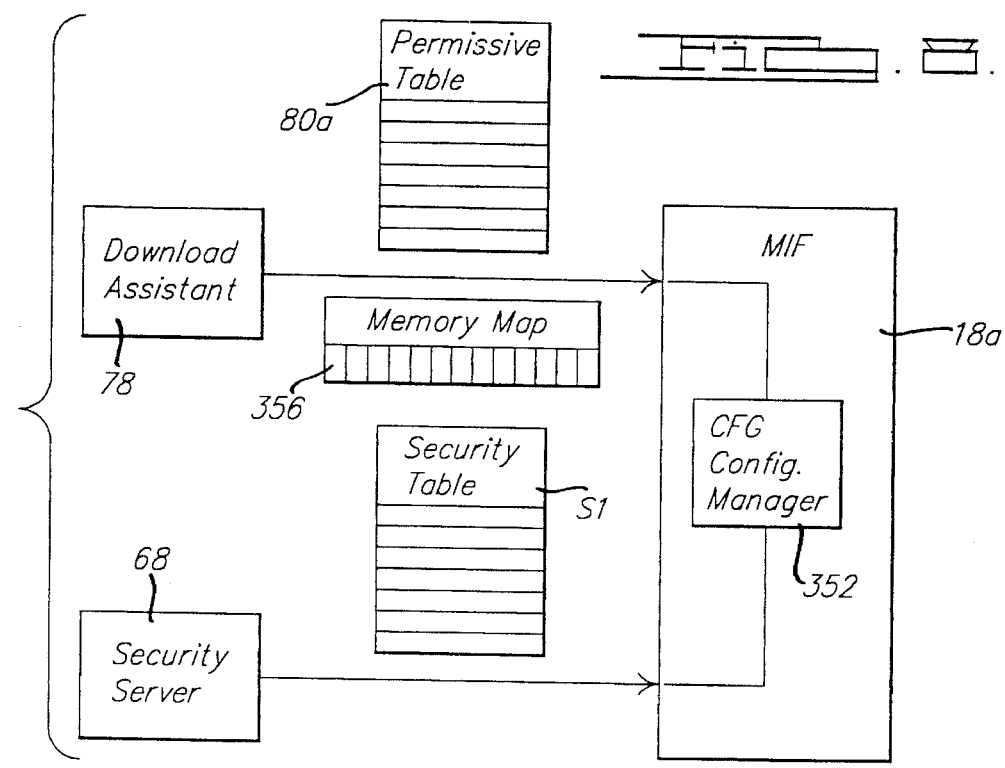

Refering to FIG. 8, a diagrammatic illustration of the configuration for the front end computer 18a is shown. Specifically, FIG. 8 illustrates that the CFG Config Manager module 352 interacts with the security server 68 and the download assistant 78 to obtain the information necessary to configure the front end computer 18a on boot up. In this regard, the CFG Config Manager module 352 is responsive to requests from the MIF Master Process module 354 to perform these configuration activities. In other words, the CFG Config Manager module 352 will locate the security server 68 through the broadcast network message (as described above) and load the security table S1 which is ultimately received from the security server. Additionally, the CFG Config Manager module 352 will also load both of the permissive tables 80a–82a from the download assistant 78. The CFG Config Manager module 352 also recieves a memory map for each of the process control computers 12a–12b, such as the memory map 356 shown in FIG. 8. The memory maps are used to enable the front end computer 18a to build the transfer tables (e.g., transfer table 37) and interpret the data received in each of the reflective memory buffers 314. In other words, each of the memory maps identify the data which is stored in each addressable location of the dual-ported data memory 22 for each of the process control computers 12a–12b. As part of this process, the memory map divides the dual-ported data memory 22 of the process control computer 12 into logical segments. The first set of segments are used for SDSS data values, while the DSS data values include the SDSS memory segments, as well as additional segments.

As discussed above, the MI Sync subsystem 310 is responsible for grouping the DMA completion events relative to the transfer of SDSS and DSS data for both process control computers 12a–12b into a cohesive pair of data tables that represent data for a given process control cycle snap-shot. For purposes of this discussion these DMA completion events will be referred to as the Left SDSS buffer, the Right SDSS buffer, the Left DSS buffer and the Right DSS buffer. The exact order in which these data buffers are received may vary, but the SDSS buffers will precede the DSS buffers.

The MI Sync subsystem 310 is responsive to the above identified DMA events. In this regard, the MI Sync subsystem 3 10 will wait for the completion of a DMA event, and then check the status to determine the type of buffer received. If the buffer received is an SDSS buffer and the front end computer 18 has already received a corresponding DSS buffer, then final completion processing will be performed. Likewise, if the buffer for this type has already been received, final completion processing will be performed. If the buffer received is not the first buffer, then the MI Sync subsystem 310 will check the time difference between the current time and the time at which the first buffer was received. If this difference exceeds a predetermined tolerance, such as 0.7 seconds, then the steps for final completion processing will be performed. If this is the first buffer (e.g., the Left SDSS buffer), then the time that this buffer was received will be recorded. If this buffer was not expected at this point, then its status will be changed to expected. The pointer to this buffer will also be recorded, and the buffer will be marked as received.

The MI Sync subsystem 310 will also check to see if all expected buffers have been received (e.g., the Left/Right SDSS and Left/Right DSS buffers). If all the expected buffers have been received, then final completion processing will be performed. During final completion processing, the buffer pointers for the received buffers will be copied to a system data structure which will allow other applications to access this data. This procedure is protected by a mutual exclusion semaphore, which is referred to as the "mutex". Additionally, the error counters will be zeroed for all received buffers. If any expected buffers were not received, the associated error counters will be incremented. If the error counters exceed the allowed threshold, then the affected buffers will be marked as not expected. Then all buffers will be marked as not received in order to set up the processing for the next set of buffers. Applications that access the memory buffers received may then copy the buffer pointers out of the shared system data structure for use.

In order to more fully illustrate the operation of the MI Sync subsystem 310, a module synopsis and the pseudo-code for this software will be presented below. Additionally, the data structures for the reflective memory buffers 314 will also be set forth as well to assist the interpretation of the pseudo-code. The data structures are contained in Tables 1–3, the module synopsis is contained in Table 4, and the pseudo-code follows immediately thereafter.

TABLE 1

Reflective Memory Data Structures

| Data Item | Data Format | Description |
|---|---|---|
| Data Structure MI_RM_DATA | | |
| RM_MUTEX | Mutex | Mutex used to protect this data structure |
| RM_STATUS | Word | Indicates current reflective memory status |
| LEFT_SDSS_PTR | Pointer | Pointer to current left SDSS reflective memory buffer |
| RIGHT_SDSS_PTR | Pointer | Pointer to current left SDSS reflective memory buffer |
| LEFT_DSS_PTR | Pointer | Pointer to current left DSS reflective memory buffer |
| RIGHT_DSS_PTR | Pointer | Pointer to current right DSS reflective memory buffer |
| FOX_DSS_PTR | Pointer | Pointer to current fox DSS reflective memory buffer |
| DOG_DSS_PTR | Pointer | Pointer to current dog DSS reflective memory buffer |
| FOX_MAP_PTR | Pointer | Pointer to current memory map (left or right) for the current fox buffer |
| DOG_MAP_PTR | Pointer | Pointer to current memory map (left or right) for the current dog buffer |
| FOX_SIDE | Longword | Indicates the channel that is the fox 0 = left, 1 = right, −1 = undefined. |
| DOG_SIDE | Longword | Indicates the channel that is the dog. 0 = left, 1 = right, −1 = undefined. |
| LEFT_INFO_BYTE | Byte | Info byte for outbound CISS requests satisfied from the left buffer. Includes fox/dog status. |
| RIGHT_INFO_BYTE | Byte | Info byte for outbound CISS requests satisfied from the right buffer. Includes fox/dog status. |
| FOX_INFO_BYTE | Byte | Info byte for outbound CISS requests satisfied from the fox buffer. Includes left/right status. |
| DOG_INFO_BYTE | Byte | Info byte for outbound CISS requests satisfied from the dog buffer. Includes left/right status. |

TABLE 2

Reflective Memory Data Structures

| Data Item | Data Format | Description |
|---|---|---|
| Data Structure MI_RMBMS[4] - Structure Array | | |
| NOTE: | | The Reflective Memory Buffer Management Structure (MI_RMBMS) array consists of four MI_RMB_STATUS_TYPE (define below data structures. Each RMBMS entry is used to keep track of a specific reflective memory type (left/right SDSS and DSS). Symbolic indices are defined to access this array: MI_RM_L_SDSS, MI_RM_R_SDSS, MI_RM_L_DSS, and MI_RM_D_DSS. |
| LAST_RECEIVED | Time | Specifies the time of receipt of the last buffer for this type. |
| DMA_EVENT | Object Variable | Contains the VAXELN object ID for the event signaled by IFQ Driver when a DMA completion for this type of memory buffer completes. |
| ENABLE_EVENT | Object Variable | Contains the VAXELN object ID for the event signaled by calling MI_ENABLE_STROBES to tell MI Sync that strobes have been enabled. |
| DISABLE_EVENT | Object Variable | Contains the VAXELN object ID for the event signaled by IFQ Driver when a DMA completion for this type of memory by calling MI_DISABLE_STROBES to tell MI Sync that strobes have been disabled. |
| PEND_BUFF_PTR | Pointer | Contains a pointer to the DMA buffer received for |

TABLE 2-continued

Reflective Memory Data Structures

| Data Item | Data Format | Description |
|---|---|---|
| | | this memory type in the current time window. Reset to null by MI Sync upon copying pointers to MI_RM_DATA. |
| RMB_STS | Longword | Longword bit masks indicating the status of this reflective memory buffer. The individual bit fields are listed below. |
| | | RMB_STS_V_EXPECTED — Bit — Bit in RMB_STS that indicated that the associated strobe for this reflective memory type is enabled, thus indicating that DMA completions are expected. |
| | | RMB_STS_V_RECEIVED — Bit — Bit in RMB_STS used by MI Sync to indicate that a DMA completion for this reflective memory type has occurred in the current DMA time window. Cleared whenever a complete set of buffers has been received, and then set for each individual buffer type as it is received. |
| | | RMB_STS_V_DSS_BUFF — Bit — Indicates if the reflective buffer type in question is either for the left or right DSS reflective memory buffer. |
| | | RMB_STS_V_ENABLED — Bit — Indicates if the associated strobe is enabled. |
| CONS_ERR_COUNT | Longword | Specifies the number of consecutive receive failures for this buffer type. |
| DMA_ERR_COUNT | Longword | Specifies the number of consecutive DMA completion failures for this buffer type. |
| ADSB | Structure | Specifies the Asynchronous Data Status Block used by the drive to indicated DMA completion status. This structure is of the IFQS_ADSB type and includes a status field and a buffer number field. |
| BUFFER_PTR | Pointer Array[8] | The BUFFER_PTR array the addresses of up to eight DMA buffers used for this reflective memory type, in the order the buffers where specified in the IFQS_ENABLE_DSS or SDSS call. This array is subscripted by the buffer number field returned in the ADSB to retrieve the base address of the DMA buffer just received. This dimension of this array allows for the maximum number of DMA buffers supported by the IFQ driver. |
| BUFF_HST_IDX | Longword | Index to the BUFF_HIST_PTR array. Indicates the most recently updates buffer. |
| BUFF_HIST_PTR | Pointer Array[8] | Circular buffer of most recently received DMA buffers. Indicates the buffers received in the last eight seconds. BUFF_HIST_IDX points to the most recent entry. |
| MOD_TASK | Longword | Indicates the PCC task state as indicated by the most recent reflective memory update. Valid only if RMB_STS_V_DSS_BUFF is set. |

TABLE 3

Reflective Memory Data Structures

| Data Item | Data Format | Description |
|---|---|---|
| Data Structure MI_RM_AUX | | |
| LAST_DSS_L_PTR | Pointer | Pointer to most recent left DSS buffer. Set by MI Sync and used by MI Health Check and MI System Messages. |
| LAST_DSS_R_PTR | Pointer | Pointer to most recent right DSS buffer. Set by MI Sync and used by MI Health Check and MI System Messages. |
| WD_FLAG | Longword | Flag used by MI Sync and MI Watchdog to check for MI Sync activity. |

TABLE 3-continued

Reflective Memory Data Structures

| Data Item | Data Format | Description |
|---|---|---|
| DMA_BUFFER_COUNT | Longword | Specifies the number of DMA buffers currently in use. Copied from MIF_MP.NUM_DMA_BUFFERS on startup. |
| TIME_CHANGE | Event Object | Set when a time change occurs. Tells MI Sync to re-determine the time of the first DMA receipt |
| SYSMSG_L_SEMA | Semaphore Object | Set by MI Sync to trigger MI System Messages to process left reflective memory. |
| SYSMGR_R_SEMA | Semaphore Object | Set by MI Sync to trigger MI System Messages to process right reflective memory. |
| HEALTH_L_SEMA | Semaphore Object | Set by MI Sync to trigger MI Health Check to process left reflective memory. |
| HEALTH_R_SEMA | Semaphore Object | Set by MI Sync to trigger MI Health Check to process right reflective memory. |

TABLE 4

Reflective Memory Data Structures

| Data Item | Data Format | Description |
|---|---|---|
| Module Synopsis for MI_SYNC_MAIN | | |
| ABSTRACT | Synchronizes receipt of in-incoming DMA buffers | |
| MODULE TYPE | Process mainline | |
| EVENTS/ SEMAPHORES | MI_RMBMS(*). DMA_EVENT | The four (left/right DSS/SDSS) completion events signaled by the IFQ Driver process on receipt of a new reflective memory buffer. Indices to the MI_RMBMS array are MI_RM_L_DSS, MI_RM_R_DSS, MI_RM_L_SDSS and MI_RM_R_SDSS. |
| | MI_RMBMS(*). ENABLE_ EVENT | The four (left/right DSS/SDSS) DMA enable events. These are signaled by MI_ENABLE_STROBES to notify MI Sync of changes in the receipt of SDSS and DSS DMA updates. |
| | MI_RMBMS(*). DISABLE_ EVENT | The four (left/right DSS/SDSS) DMA disable events. These are signaled by MI_DISABLE_STROBES to notify MI Sync of changes in the receipt of SDSS and DSS DMA updates. |
| | MI_RM_AUX_ HEALTH_L_ SEMA | Signaled to tell MI MOD Health to process left health bits. |
| | MI_RM_AUX_ HEALTH_R_ SEMA | Signaled to tell MI MOD Health to process right health bits. |
| | MI_TM_AUX_ SYSMSG_L_ SEMA | Signaled to tell MI System Messages to process left system messages. |
| | MI_TM_AUX_ SYSMSG_R_ SEMA | Signaled to tell MI MOD Health to process right system messages. |
| OTHER INPUTS | M_RMBMS(*). ADSB | Asyncronous Data Status Blocks for each of the four DMA completion events. |
| | DSS data buffer | Accessed at offset MI_TASK_STATE_L or MI_TASK_STATE_R to determine FOX/DOG status. |
| OUTER OUTPUTS | MI_RM_DATA | Structure containing current reflective memory pointers. |
| | MI_RM_AUX. WD_FLAG | Set to 1 to indicate receipt of data. |
| CALLED ROUTINES | KER$WAIT_ANY KER$CLEAR_EVENT KER$LOCK_MUTEX KER$UNLOCK_MUTEX | |
| CONDITION CODES | MIF_NORMAL MIF_IFQ_ERROR MIF_APP_ERROR | |

MI_SYNC_Main Pseudo-code

PROGRAM MI_SYNC_MAIN
waiting for_first_DMA = true
REPEAT
    /* Issue the wait any for the four DMA completion events,

TABLE 4-continued

Reflective Memory Data Structures

```
        the an enable or disable of strobes, or time changes: */
    CALL KER$WAIT_ANY with       MI_RMBMS[0].DMA_EVENT,
                                 MI_RMBMS[1].DMA_EVENT,
                                 MI_RMBMS[2].DMA_EVENT,
                                 MI_RMBMS[3].DMA_EVENT,
                                 MI_RMBMS[0].ENABLE_EVENT,
                                 MI_RMBMS[1].ENABLE_EVENT,
                                 MI_RMBMS[2].ENABLE_EVENT,
                                 MI_RMBMS[3].ENABLE_EVENT,
                                 MI_RMBMS[0].DISENABLE_EVENT,
                                 MI_RMBMS[1].DISENABLE_EVENT,
                                 MI_RMBMS[2].DISENABLE_EVENT,
                                 MI_RMBMS[3].DISENABLE_EVENT,
                                 MI_RM_AUX.TIME_CHANGE,
                                 and wait_result
    RMBMS_idx = (wait_result - 1) MOD 4
    case_idx = wait result_DIV 4
    CASE [case_idx]
        [0] Call DMA_Completion
        [1] Call DMA_Enable
        [2] Call DMA_Disable
        [3] Call Time_Change
    ENDCASE
    REPEAT for i = 0 to 3
        still waiting = MI-RMBMS(i).RMB_STS_V_EXPECTED is set
            and RMB_STS_V_RECEIVED is clear
    UNTIL (still_waiting or final iteration)
    IF ^still_waiting THEN
        We have a complete set of buffers;
        Check MOD TASK values for valid combination
        CALL update_pointer (MIF_NORMAL)
        waiting_for_first_DMA = true
    ENDIF
    UNTIL MIF shutdown required
    EXIT
SUBROUTINE DMA_Completion
    CALL KER$CLEAR_EVENT MI_RMBMS[RMBMS_idx].DMA_EVENT
    MI_RM_AUX.WD_FLAG = 1
    current_time = Current system time
    IF waiting_for_first_DMA
        first_dma_time = current time
        waiting_for_first_DMA = false
    ELSE
        If current_time - first_dma_time>MI Sync_TOLERANCE
            Log Error "Out of sync-- Did not receive required DMA"
            Check for excessive failures:
            FOR i = 0 to 3
                IF  MI-RMBMS[i].RMS_STS_V_EXPECTED is set
                        and RMB_STS_V_RECEIVED is clear
                    MI_RMBMS[i].PEND_BUFF_PTR = null
                    Log Error "Failed to receive DMA for [DMA type]"
                    MI_RMBMS[i].RMB_CONS_ERRORS =
RMB_CONS_ERRORS+1
                    IF MI_RMBMS[i].RMB_CONS_ERRORS > tolerance then
                        Log Error "No longer expecting [DMA type]--
                        too many consecutive failures"
                        (broadcast error message)
                    Clear MI_RMBMS[i].RMB_STS.V_EXPECTED
                END IF
            ENDIF
        ENDFOR
        Update pointers with available data:
        CALL update_pointers (MIF_NO_SYNC)
        first_dma_time = current time
        /* Fall through to use this buffer as the first buffer
        in the next set . . . */
        ENDIF
    ENDIF
If buffer type is SDSS and DSS and corresponding DSS received,
    then CALL update_pointers
ENDIF
WITH MI_RMBMS(RMBMS_idx)
    If *.RMB_STS_V_RECEIVED is set
        Log Error ("Out of Sync-- DMA collision")
        CALL update_pointers (MIF_DMA_COLL)
        first_dma_time= current time
        /* Fall through to use this buffer as the first
```

TABLE 4-continued

Reflective Memory Data Structures

```
         in the next set . . . */
    ENDIF
    IF*.RMB_STS_V_EXPECTED is not set
         Log Error ("Unexpected DMA completion")
    ENDIF
    If *.RMB_STS_V_DISABLED is set
         Log Error ("Received complete for disabled strobe")
         Return
    ENDIF
Check DMA completion status in ADSB
IF error
    *.CONS_ERR_COUNT = *.CONS_ERR_COUNT + 1
    IF *.CONS_ERR_COUNT < 5 Then
         Log Error ("DMA failure on channel")
    ELSE
         IF *.CONS_ERR_COUNT MOD 300 = 1
         Log Error ("DMA still failing")
         ENDIF
    ENDIF
ELSE
    *.CONS_ERR_COUNT = 0
ENDIF
rm_buffer_ptr = *.BUFFER_PTR[*.ADSB.buffer_number - 1]
*.RECEIVED_DATE_TIME = current_time
*.PEND_BUFF_PTR = rm_buffer_ptr
*.RMB_STS_V_EXPECTED = true
Set *.RMB_STS_V_RECEIVED
IF *.RMB_STS_V_DSS_BUFF is set
    get mod state using rm_buffer_ptr offset by *.RM_TASK_OFFSET
    *.MOD_TASK = mod_state
    IF RMBMS-IDX = MI_RM_L_DSS
         MI_RM_AUX.LEFT._RM_PTR = rm_buffer_ptr
         Signal MI_RM_AUX.HEALTH_L_EVENT
         Signal MI_RM_AUX.SYSMSG_L_EVENT
    ELSE
         MI_RM_AUX_RIGHT_RM_PTR = rm_buffer_ptr
         Signal MI_RM_AUX.HEALTH_R_EVENT
         Signal MI_RM_AUX.SYSMSG_R_EVENT
    ENDIF
ENDIF
ENDWITH
RETURN
END SUBROUTINE
```

```
SUBROUTINE DMA_ENABLE
    Clear MI_RMBMS[RMBMS_idx].DMA_ENABLE (KER$CLEAR_EVENT)
    MI_RMBMS [RMBMS_idx].RMB_STS_V_DISABLED = false
    MI_RMBMS [RMBMS_idx].RMB_STS_V_EXPECTED = true
    RETURN
END SUBROUTINE
```

```
SUBROUTINE DMA_DISABLE
         Clear MI_RMBMS [RMBMS_idx].DMA_DISABLE (KER$CLEAR_EVENT)
         MI_RMBMS [RMBMS_idx].RMB_STS_V_DISABLE = true
         MI_RMBMS [RMBMS_idx].RMB_STS_V_EXPECTED = false
         MI_RMBMS [RMBMS_idx].PEND_BUFF_PTR = Null
    RETURN
END SUBROUTINE
```

```
    SUBROUTINE TIME_CHANGE
         CALL KER$CLEAR_EVENT with MI_Rm_AUX.TIME_CHANGE
         current_time = Current system time
         first_dma_time = current_time
         RETURN
    END SUBROUTINE
SUBROUTINE update_pointers (state)
    Lock MI_RM_GLOBALS mutex
    MI_RM_DATA.RM_STATUS = state
    Copy the LEFT/SIDE SDSS/DSS pointers:
    MI_RM_DATA.LEFT_SDSS_PTR =
         MI_RMBMS (MI_SDSS_L_IDX).PEND_BUFF_PTR
    MI_RM_DATA.RIGHT_SDSS_PTR =
         MI_RMBMS (MI_SDSS_R_IDX).PEND_BUFF_PTR
    MI_RM_DATA.LEFT_DSS_PTR =
         MI_RMBMS (MI_DSS_L_IDX).PEND_BUFF_PTR
    MI_RM_DATA_RIGHT DSS _PTR =
         MI-RMBMS (MI_DSS_R_IDX).PEND_BUFF_PTR
```

TABLE 4-continued

Reflective Memory Data Structures

```
    Clear FOX/DOG pointers:
    MI_RM_DATA.FOX_DSS_PTR = null
    MI_RM_DATA.DOG_DSS_PTR = null
    MI_RM_DATA.FOX_MAP_PTR = null
    MI_RM_DATA.DOG_MAP_PTR = null
    Mark the info byte as "not prime" until proven otherwise:
    Clear MI_RM_DATA.RIGHT_INFO-BYTE prime bit /* Bit 0 */
    Clear MI_RM_DATA.LEFT_INFO-BYTE prime bit
    Set Fox side and dog side to "unknown" (1):
    MI_RM_DATA.FOX_SIDE = -1
    MI_RM_DATA.DOG_SIDE = -1
    Determine new FOX/DOG information:
    IF MI_RMBMS (MI-DSS-L-IDX).MOD_STATUS = fox status or eagle status
        MI_RM_DATA.FOX_DSS_PTR =
            MI_RMBMS (MI_DSS_L_IDX).PEND_BUFF_PTR
        MI_RM_DATA.FOX_MAP_PTR = Addr (MEMORY_MAP_L_TABLE)
        Set MI_RM_DATA.FOX_INFO_BYTE left/right bit /* bit 0 */
        Set MI_RM_DATA.LEFT_INFO_BYTE prime bit /* bit 2 */
        MI_RM_DATA.FOX_SIDE = 0 /* Left */
        IF MI_RMBMS (MI_DSS_R_IDX).MOD_STATUS = dog_status or "task B"
            MI_RM_DATA.DOG_DSS_PTR =
                MI_RMBMS (MI_DSS_R_IDX). PEND_BUFF_PTR
            MI_RM_DATA.DOG_MAP_PTR = Addr (MEMORY_MAP_L_TABLE)
            Clear MI_RM_DATA.DOG_INFO_BYTE left/right bit
            MI_RM_DATA.DOG_SIDE = 1 /* Right */
        ENDIF
    ELSE
        IF MI_RMBMS (MI_DSS_R_IDX).MOD_STATUS = fox status or eagle status
            MI_RM_DATA.FOX_DSS_PTR =
                MI_RMBMS (MI_DSS_R_IDX).PEND_BUFF_PTR
            MI_RM_DATA.FOX_MAP_PTR = Addr (MEMORY_MAP_R_TABLE)
            Clear MI_RM_DATA.FOX_INFO_BYTE left/right bit
            Set MI_RM_DATA.RIGHT_INFO_BYTE prime bit
            MI_RM_DATA.FOX_SIDE = 1 /* Right */
            IF RMBMS (MI_DSS_L_IDX).MOD_STATUS = dog_status or "task B"
                MI_RM_DATA.DOG_DSS_PTR =
                    MI_RMBMS (MI_DSS_L_IDX).PEND_BUFF_PTR
                MI_RM_DATA.DOG_MAP_PTR = Addr (MEMORY_MAP_L_TABLE)
                Set MI_RM_DATA.DOG_INFO-BYTE left/right bit
                MI_RM_DATA.DOG_SIDE = 0 /* Left */
            ENDIF
        ENDIF
    ENDIF
    Release MI_RM_GLOBALS mutex
    Clear context:
    FOR i = 0 to 3
        MI_RMBMS (i).PEND_BUFF-PTR = null
        Clear MI_RMBMS (i).RMB_STS_V_RECEIVED
    ENDFOR
END SUBROUTINE
ENDPROGRAM
```

Figure 9:
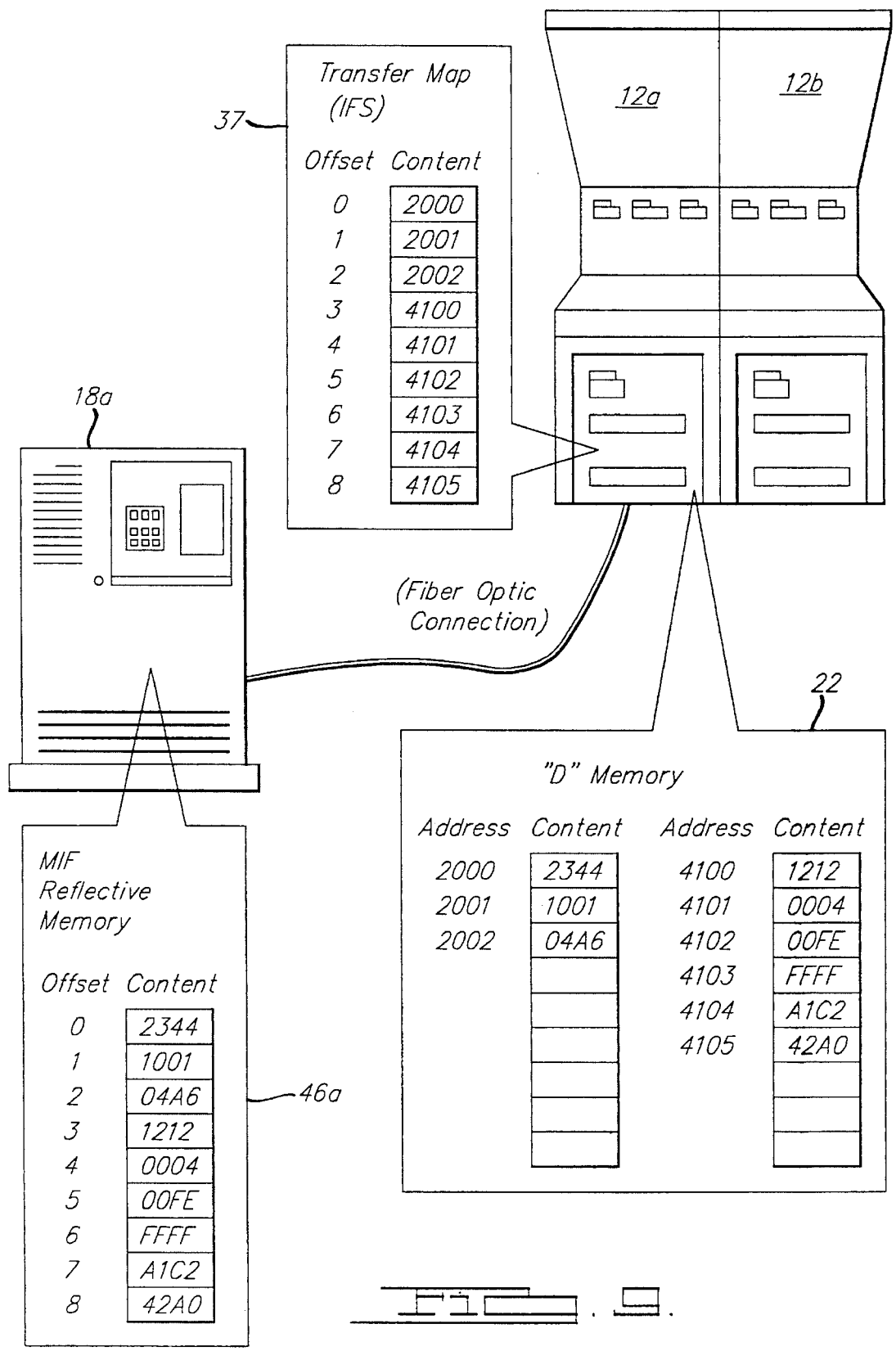
FIG. 9 is a a diagrammatic illustration of the relationship between the reflective memory buffers in the front end computers, the transfer map in the IFS circuit and the data memory in the process control computers.

Refering to FIG. 9, a diagrammatic illustration is shown of the relationship between the reflective memory buffers 314 in the front end computer 18a, the transfer map 37 in the IFS circuit 28 and the dual-ported data memory 22 in the process control computers 12a–12b. For purposes of illustration, the data memory 22 is shown to include only two segments. The transfer map 37 indicates that data memory addresses 2000 to 2002 (hex) in the first segment, and data memory addresses 4100 to 4105 (hex)in the second segment are to be transferred to the reflective memory buffer 46a. More specifically, it should be observed that the transfer map 37 creates a block of contiguous data elements from memory locations in the data memory 22 which are not necessarily contiguous.

Refering to FIG. 10, a block diagram of the IFS circuit 28 is shown. In this block diagram, the individual transmitters and receivers (e.g., transmitter 38a and receiver 40a) are shown in a single block 400 which also includes the AT&T ODL200 series light converters. The IFS circuit 28 also includes control blocks 402, 404 which govern the transfer of data/address signals m and from the transmitter/receiver block 400. In this regard, the IFS circuit 28 includes both an address buffer 406 and a data buffer 408 to facilitate these signal transfers. An address latch 410 is also provided for sending a data memory address to the stealth port. Similarly, a transceiver 412 is provided to enable the IFS circuit 28 to send or receive data information via the data bus of the stealth interface circuit 16.

The IFS circuit 28 also includes a stealth timing and control circuit 414. The stealth timing and control circuit 414 includes one or more Programmable Array Logic circuits to implement a state machine for processing specific signals to or from the stealth interface circuit 16. For example, when the SDSS signal is received, it provides an indication to IFS circuit 28 that a valid window exists for reading from the data memory 22. Assuming that the arbitration circuit on the stealth interface circuit 16 also grants access to the data memory 22, then the stealth timing and control circuit 414 will appropriately set the control status register 416. The data out control circuit 404 will respond by causing a DMA counter circuit 418 to start counting down to zero from a pre-set value. The DMA counter 418 will decrement with each data word read from the data memory 22. The DMA counter 418 in turn controls a DMA word count circuit 420 which generates an address in the transfer map 37. In other words, the DMA word count circuit 420 points to an address in the transfer map 37, which in turn points to an address in the data memory 22. Through this form of indirection, the IFS circuit 28 will read each of the locations of the data memory 22 that are specified in the transfer map 37 for the particular window permitted by the process control computer 12 through the stealth interface circuit 16.

Refering to FIG. 11, a block diagram of the IFQ circuit 30 is shown. The IFQ circuit 30 includes the Intel 80186 microprocessor, as discussed above, and the program for this microprocessor is stored in EPROM 420. Additionally, an address latch 422 is coupled to the address bus 424 of the microprocessor 42. Similarly, a data buffer 426 is connected to the data bus 428 of the microprocessor 42. A 64 Kb RAM circuit 430 is also coupled to both the address bus 424 and the data bus 428. The RAM circuit 430 is used to store system data, such as one or more stacks and other operational data structures for the microprocessor 42.

The IFQ circuit 30 also includes a fiber interface "daughter" board 432, which contains the circuits directly responsible for transmitting and receiving signals over the fiber optic cables 32. In this regard, block 434 includes the two channels of light converters and receiver circuits, and block 436 includes the two channels of light converters and transmitter/receiver circuits, as discussed above. With the Gazelle serial transmitter/receiver pairs, each of the fiber optic links to the IFS circuits 28a–28b is capable of transmitting 2.5 million, 40 bit frames per second. Block 44 represents the two 128 Kb data buffers used for initially storing SDSS and DSS data which is asynchronously received from the process control computers 12a–12b, as discussed in connection with FIG. 1. These "link" data buffers are preferably implemented using two independent memories in a dual-port configuration, one for each fiber optic channel, in order to provide real-time uninterrupted gathering of process data and messages from the IFS circuits. The block 438 represents the provision of at least one word register (for each fiber optic channel) used to hold serial data to be transmitted to one of the process control computers 12a–12b.

The block 440 represent the logic circuits for controlling the storing of information into the data buffers 44 and the word register 438. The logic circuits 440 includes one or more Programmable Array Logic ("PAL") circuits for implementing a state machine for handling these data write operations. For example, when a forty bit data frame is received from one of the process control computers 12a–12b, the logic circuits 440 will decode the address and control bit in order to steer the data bits to the appropriate memory location in the data buffers 44. The fiber interface daughter board 432 also includes an interrupt circuit block 442 which contains the interrupt logic for helping the microprocessor 42 understand the state of the data write activities. In this regard, at least two separate interrupt lines are used to interconnect the interrupt circuit block 442 with the microprocessor 42 (one per fiber optic channel). Both the IFS circuit 28 and the fiber interface daughter board 432 of the IFQ circuit 30 also include a PAL state machine which examines incoming frames for errors (e.g., parity errors and 4B/5B link errors). In one embodiment of the front end communication system 10, all of the state machines on the IFQ circuit 30 operate from a 20 MHz clock signal which is derived from the 10 MHz clock signal of the microprocessor 42.

The microprocessor 42 is programmed to provide at least two DMA engines for moving data. For example, the microprocessor 42 will respond to appropriate interrupt signals from the interrupt circuit block 442 by moving data from the data buffers 44 to a dual-ported 64 Kb RAM circuit 444, which acts to provide a bucket brigade storage medium. Then, once sufficient data is stored in the dual-ported RAM circuit 444 (e.g., 8 Kb), the DMA state machine in the first in, first out ("FIFO") DMA control block 446 will move this data over the Q-bus 302 of the front end computer 18. Memory cycles are preferably interleaved between both the microprocessor 42 system bus and the Q-bus, with the system bus of the microprocessor 42 given top priority. A status register circuit 448 and a CSR circuit 450 are provided to transfer status and control information. Additionally, as shown in FIG. 11, an address buffer 452 and a DMA/FIFO counter 454 are also coupled to the address lines of the dual-ported RAM circuit 444. Similarly, a DMA/FIFO data buffer 456 for the Q-bus 302 and a data buffer for the microprocessor 42 are also coupled to the data lines of the dual-ported RAM circuit The present invention has been described in an illustrative manner. In this regard, it is evident that those skilled in the art once given the benefit of the foregoing disclosure, may now make modifications to the specific embodiments described herein without departing from the spirit of the present invention. Such modifications are to be considered within the scope of the present invention which is limited solely by the scope and spirit of the appended claims.

What is claimed is:

1. A secure front end communication system for at least one process control computer which executes an operating program compiled from a source program to control the operation of a physical process, comprising:

a computer network for enabling communication between a plurality of computers;

at least one computer entity connected to said computer network; and at least one front end computer connected between said process control computer and said computer network, said front end computer having means for storing at least one permissive table compiled from said source program, and said front end computer having means for determining whether a predetermined type of instruction from said computer entity will be transmitted to said process control computer by checking a status of an enable indicator in said permissive table for a variable which corresponds to a variable from said instruction.

2. The secure front end communication system according to claim 1 including at least two actively redundant process control computers, and wherein said front end computer is connected to each of said actively redundant process control computers.

3. The secure front end communication system according to claim 2, wherein said front end computer includes a distinct permissive table for each of said actively redundant process control computers.

4. The secure front end communication system according to claim 3, wherein at least one of said permissive tables is associated with a compiled version of the operating program of one of said actively redundant process control computers which is different than the compiled version of the operating program of one of the other of said actively redundant process control computers.

5. A method of controlling the communication of a command message from a computer entity on a computer network to a process control computer which executes an operating program compiled from a source program to control a physical process wherein the command message seeks to change at least one of a plurality of operating variables employed by said process control computer to control the physical process, comprising the steps of:

providing a front end computer which is connected between said process control computer and said computer network;

storing a permissive table compiled from said source program in said front end computer that identifies which of said operating variables may be changed by said computer entity;

receiving a command message from said computer entity;

determining if said command message includes an instruction which seeks to change at least one operating variable in said process control computer; and determining whether to transmit said command message from said front end computer to said process control computer by checking a status of an enable indicator in said permissive table which is associated with the corresponding operating variable identified in said command message.

6. A method of controlling the communication of a command message from a computer entity on a computer network to a process control computer which executes an operating program compiled from a source program to control a physical process wherein the command message seeks to change at least one of a plurality of operating variables employed by said process control computer to control the physical process, comprising the steps of:

providing a front end computer which is connected between said process control computer and said computer network;

storing a permissive table compiled from said source program in said front end computer that identifies which of said operating variables may be changed by said computer entity;

receiving a command message from said computer entity;

determining if said command message includes an instruction which seeks to change at least one operating variable in said process control computer;

determining whether to transmit said command message from said front end computer to said process control computer by checking a status of an enable indicator in said permissive table which is associated with the corresponding operating variable identified in said command message; and transmitting a program version identifier from said front end computer to said process control computer when it is determined to enable the transmission of said command message to said process control computer.

7. The method according to claim 6, including the step of determining at said process control computer whether to implement the command message received from said front end computer on the basis of whether the transmitted program version identifier matches a program version identifier stored in said process control computer.

8. The method according to claim 7, including the step of encrypting said program version identifier at said front end computer before its transmission to said process control computer.

\* \* \* \* \*